United States Patent
Inoue et al.

(10) Patent No.: US 7,096,317 B2
(45) Date of Patent: Aug. 22, 2006

(54) DISK ARRAY DEVICE AND MAINTENANCE METHOD FOR DISK ARRAY DEVICE

(75) Inventors: Masao Inoue, Odawara (JP);
Katsuhiro Okumoto, Odawara (JP);
Hisao Honma, Odawawa (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 10/768,146

(22) Filed: Feb. 2, 2004

(65) Prior Publication Data

US 2005/0132136 A1 Jun. 16, 2005

(30) Foreign Application Priority Data

Dec. 15, 2003 (JP) ............... 2003-416230

(51) Int. Cl.
*G06F 12/16* (2006.01)
(52) U.S. Cl. ..................... 711/114; 711/112
(58) Field of Classification Search ............... 711/114, 711/113, 112; 714/6
See application file for complete search history.

(56) References Cited

U.S. PATENT DOCUMENTS

| | | | | |
|---|---|---|---|---|
| 5,077,736 | A * | 12/1991 | Dunphy et al. | 714/7 |
| 5,155,835 | A * | 10/1992 | Belsan | 711/114 |
| 6,385,114 | B1 * | 5/2002 | Abe et al. | 365/226 |
| 6,834,289 | B1 | 12/2004 | Kaneda et al. | |
| 2001/0049773 | A1 | 12/2001 | Bhavsar | |
| 2003/0191891 | A1 | 10/2003 | Tanaka et al. | |
| 2003/0204683 | A1 * | 10/2003 | Okumoto et al. | 711/147 |
| 2003/0221070 | A1 * | 11/2003 | Minowa et al. | 711/147 |
| 2003/0221074 | A1 | 11/2003 | Satoyama et al. | |
| 2004/0083338 | A1 * | 4/2004 | Moriwaki et al. | 711/114 |
| 2004/0103244 | A1 | 5/2004 | Fujimoto et al. | |
| 2004/0153691 | A1 * | 8/2004 | Fujimoto et al. | 714/3 |
| 2005/0050401 | A1 | 3/2005 | Matsuki et al. | |
| 2005/0097132 | A1 * | 5/2005 | Cochran et al. | 707/104.1 |

FOREIGN PATENT DOCUMENTS

JP 2000-339101 5/1999

OTHER PUBLICATIONS

"Adaptec Storage Management Software" User's Guide (2001), 134 pages.

* cited by examiner

*Primary Examiner*—Pierre Bataille
*Assistant Examiner*—Sheng-Jen Tsai
(74) *Attorney, Agent, or Firm*—Reed Smith LLP; Stanley P. Fisher, Esq.; Juan Carlos A. Marquez, Esq.

(57) ABSTRACT

The present invention provides a technique for, in the case in which a failure has occurred in a shared memory, controlling a period of a pseudo through operation to reduce a period in which performance of a disk array device falls. Control information is divided into management information, which is required to be duplexed, and directory information, which is only required to be simplexed, and the management information and the directory information are stored in separate shared memories. In the case in which a failure has occurred in the shared memory of an expanded memory unit (Option) storing the directory information, the directory information is reestablished in the shared memory of a basic memory unit (Basic). The pseudo through operation is cancelled at the point when the directory information is reestablished. After a package of the expanded memory unit is replaced with a normal product, the directory information is reestablished again. Management information managed in the other cluster is copied to the shared memory of the basis memory unit to complete maintenance and recovery work.

8 Claims, 21 Drawing Sheets

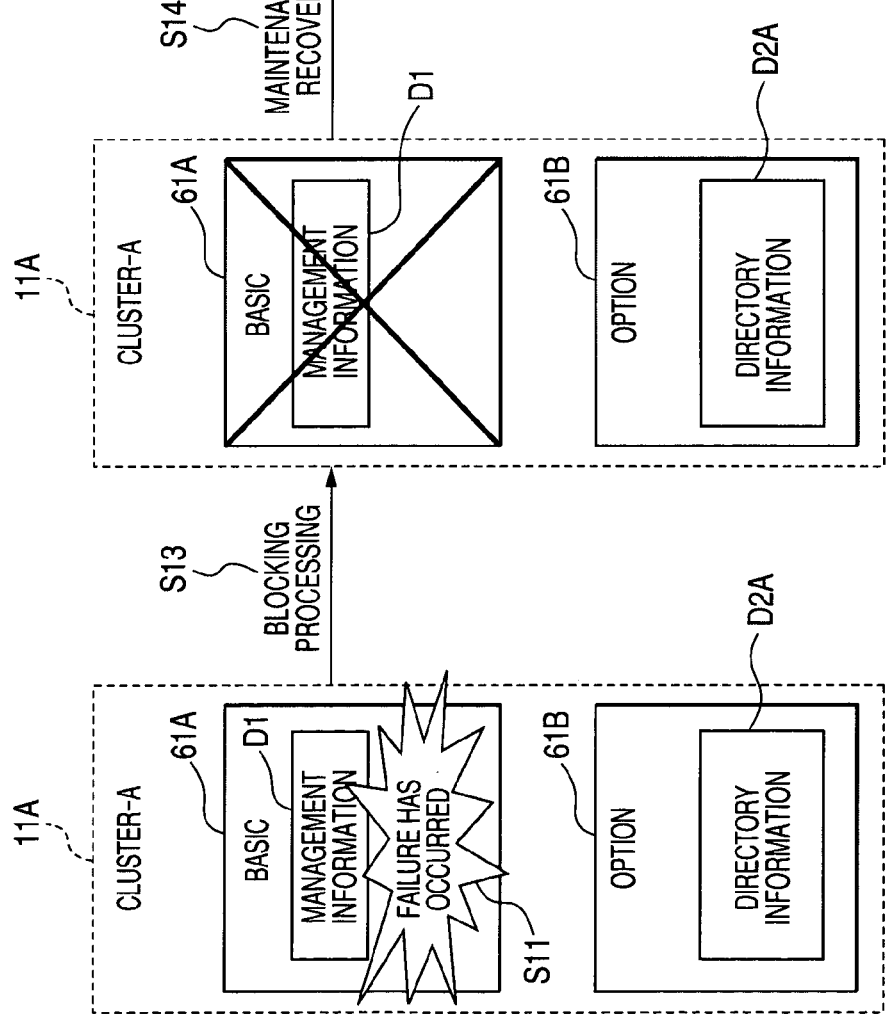

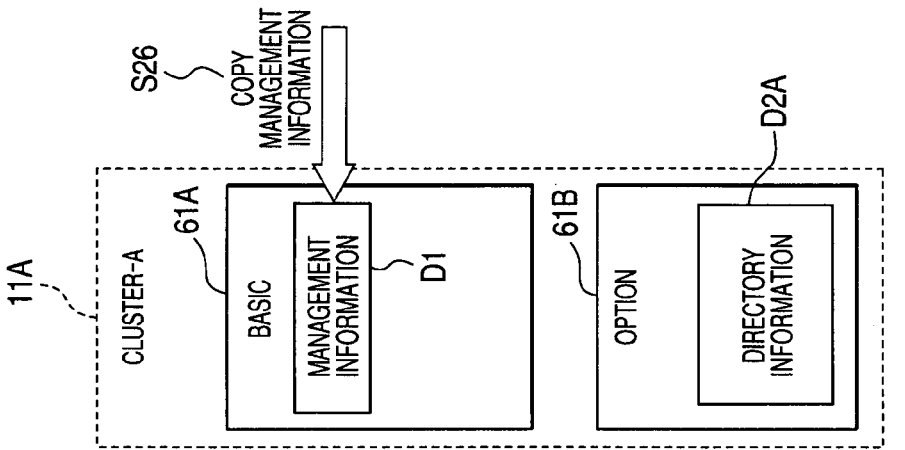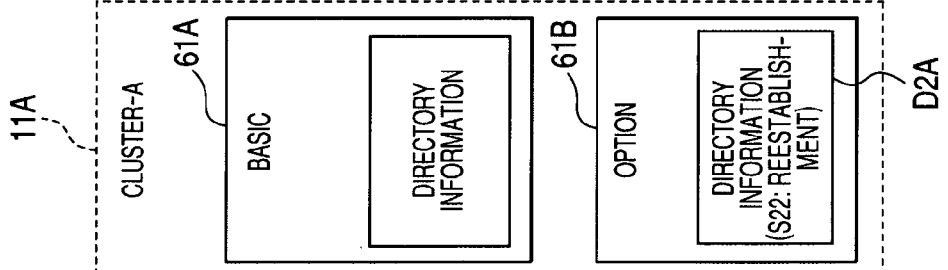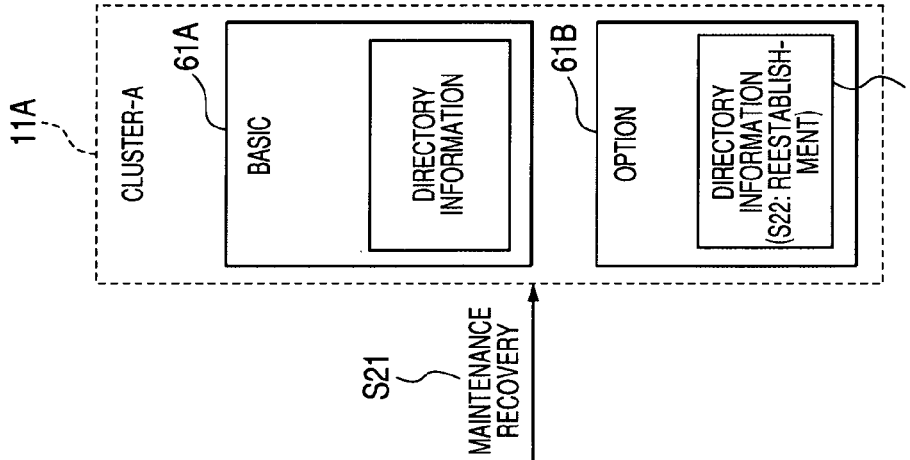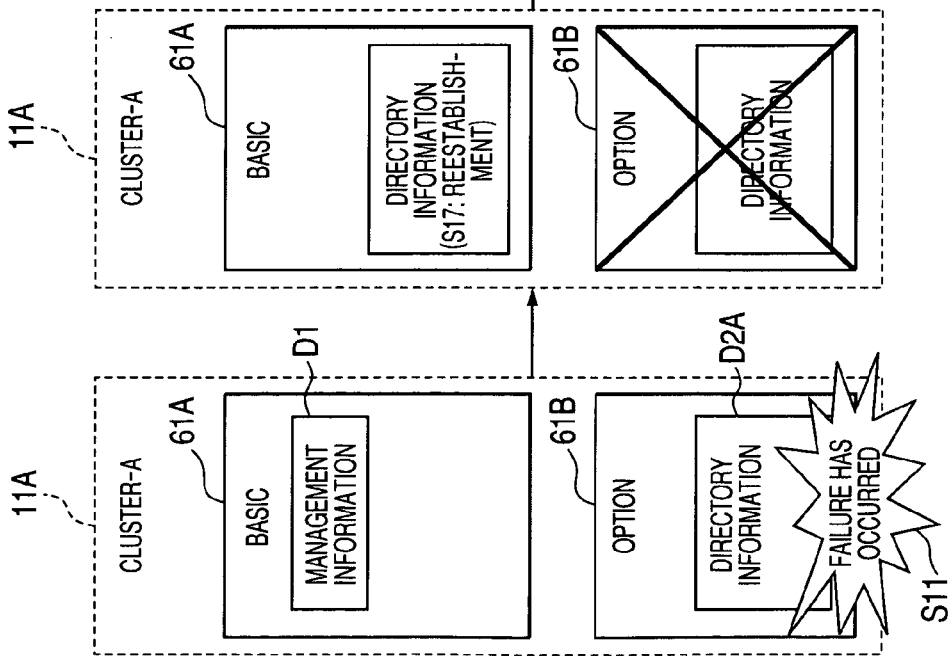

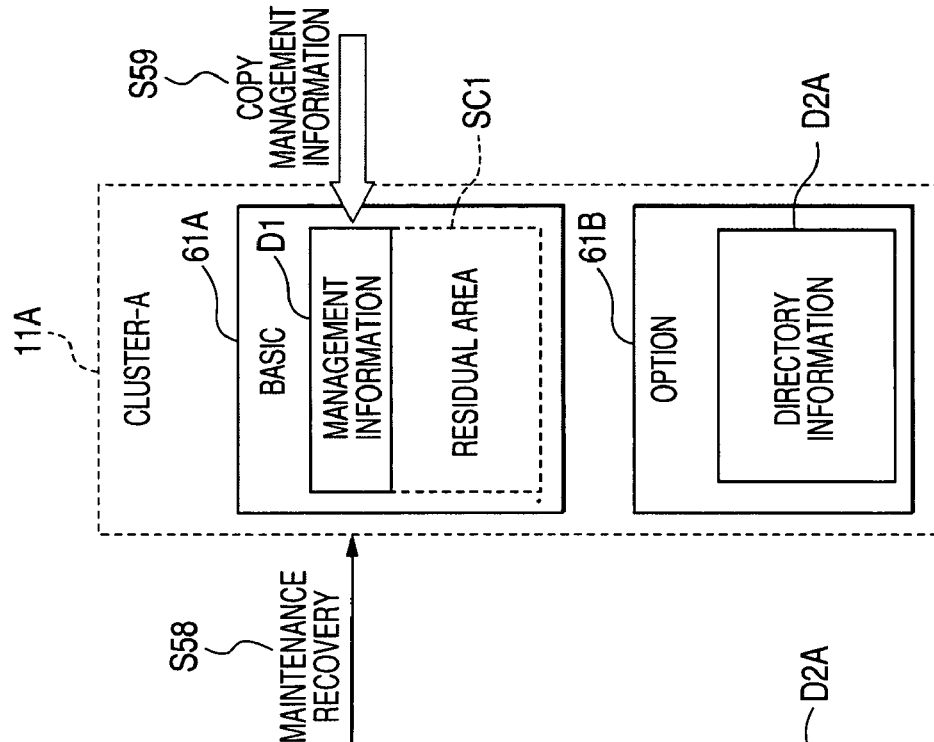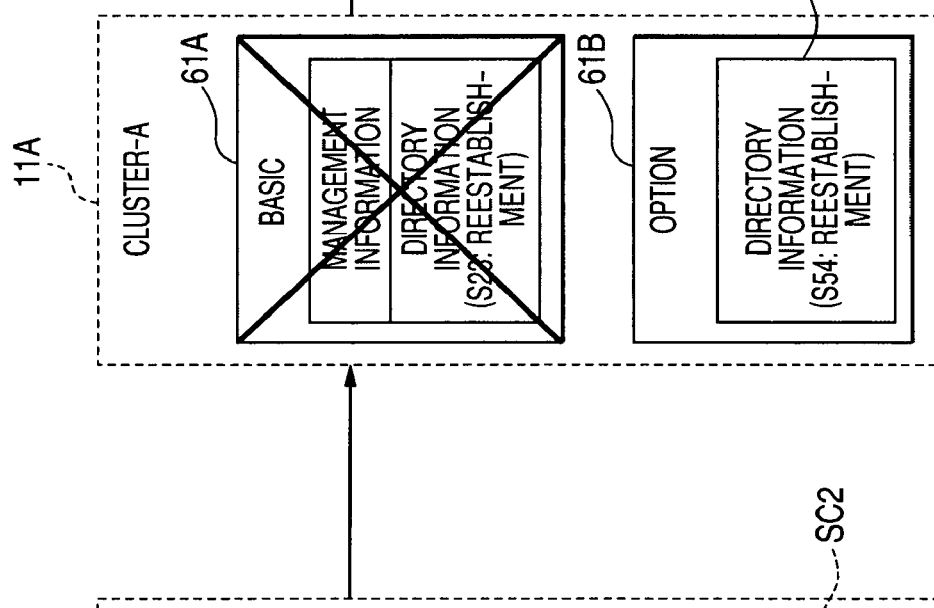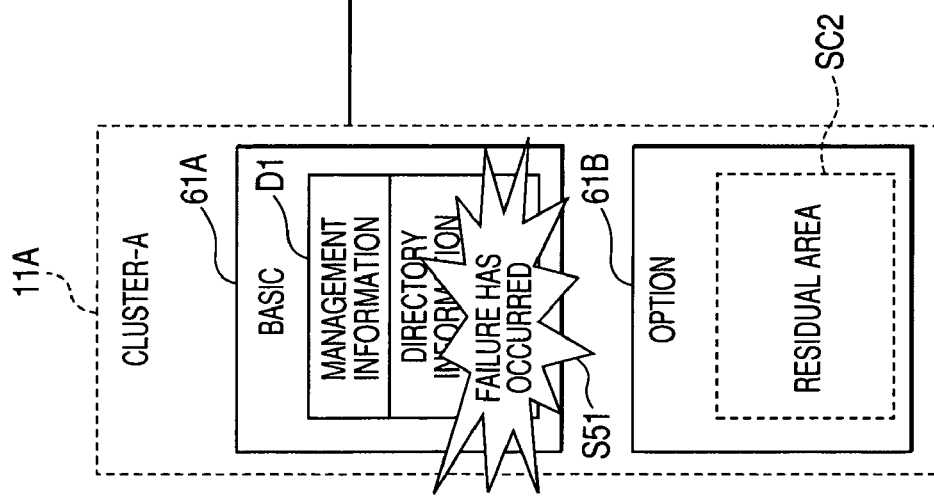

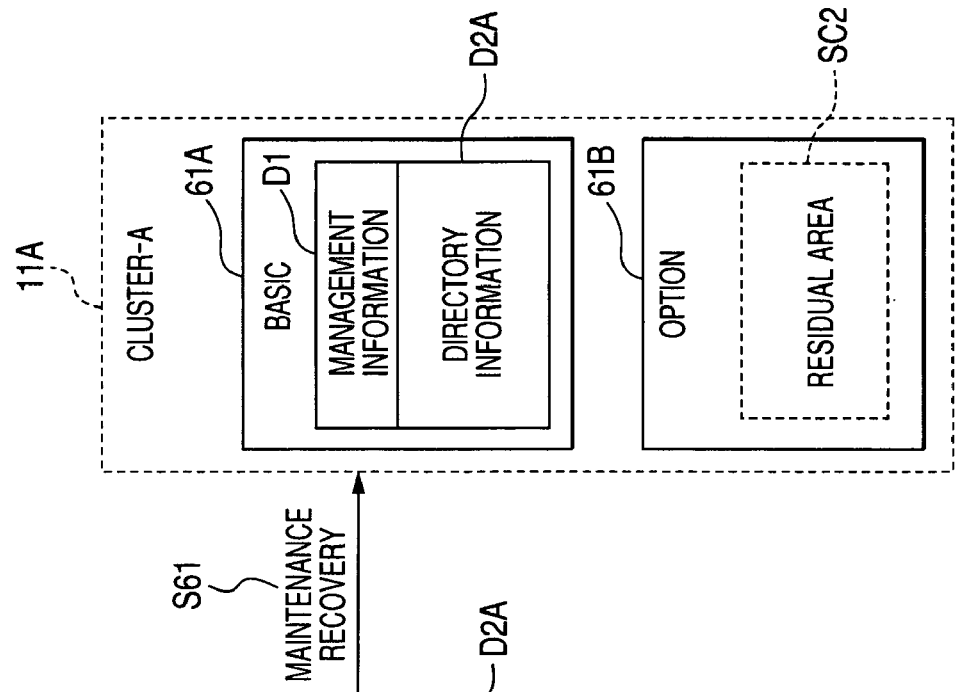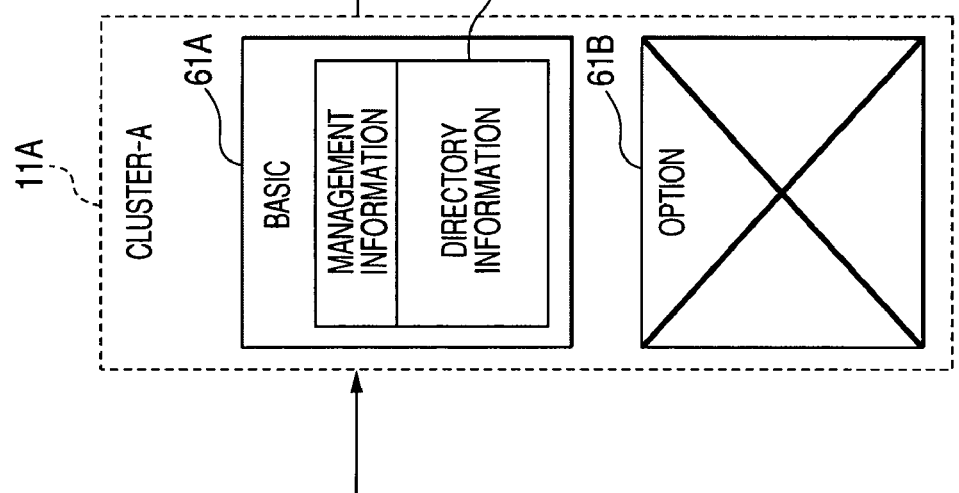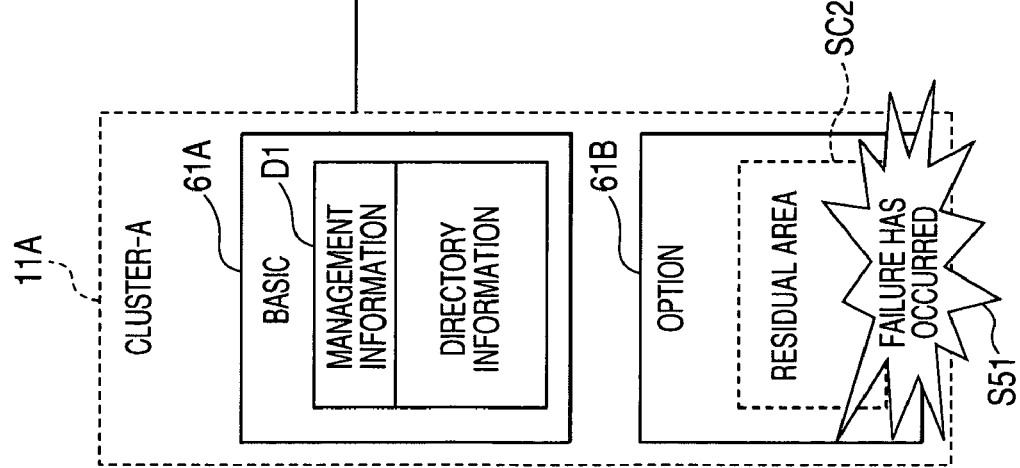

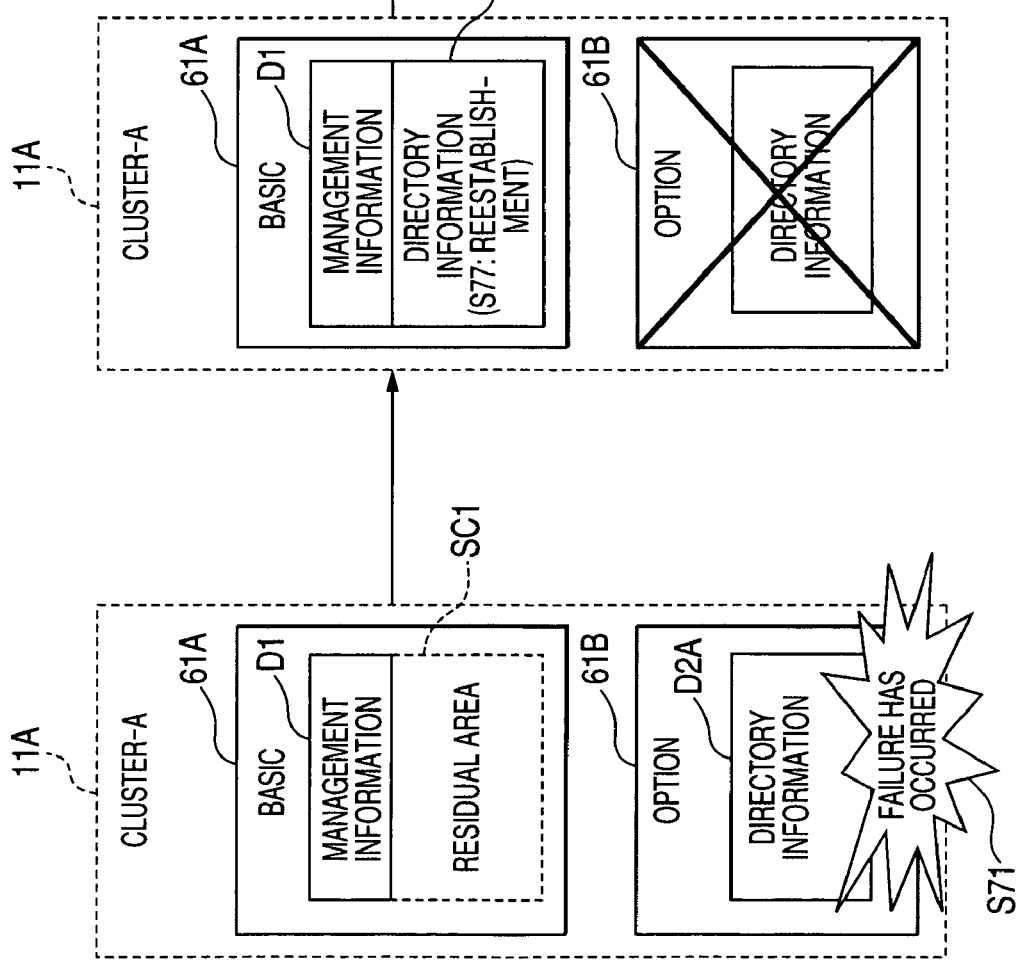
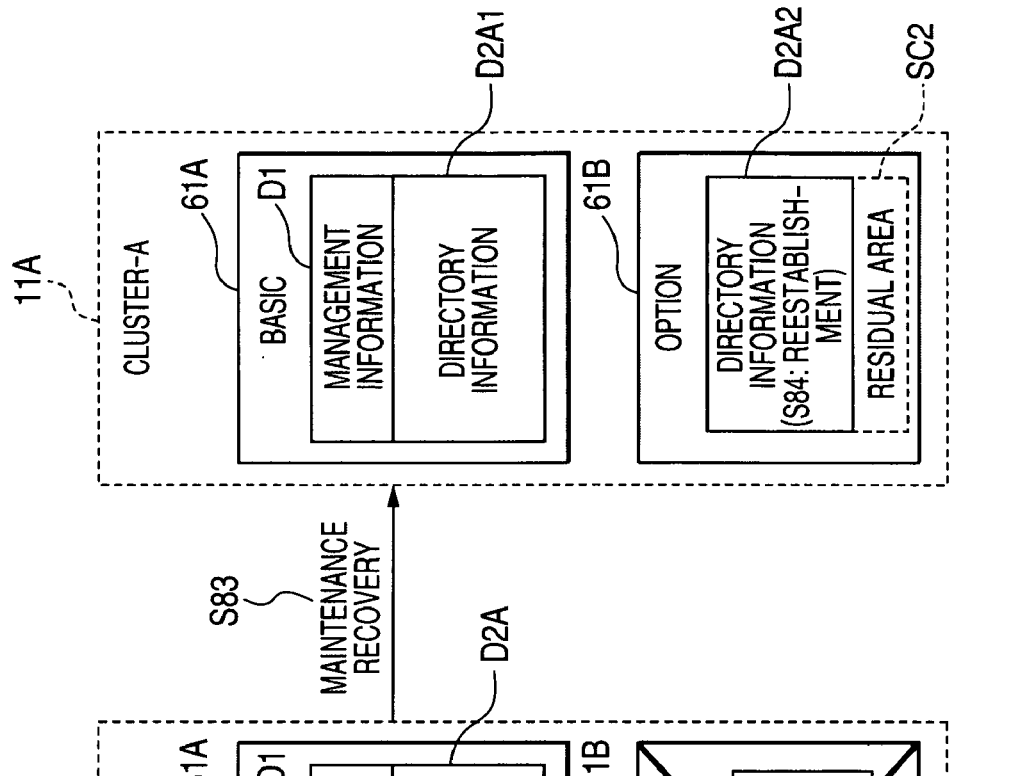

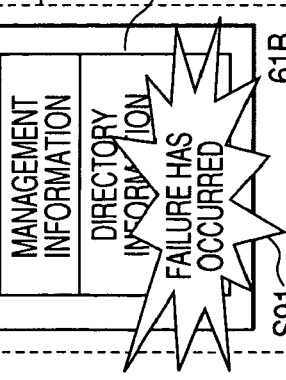

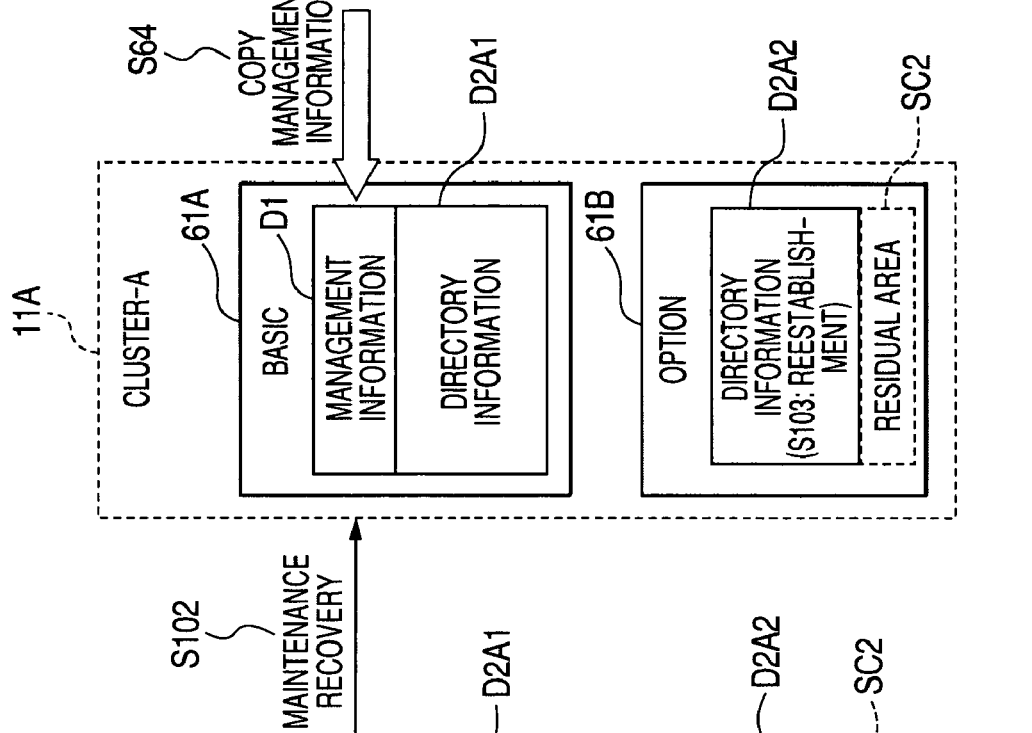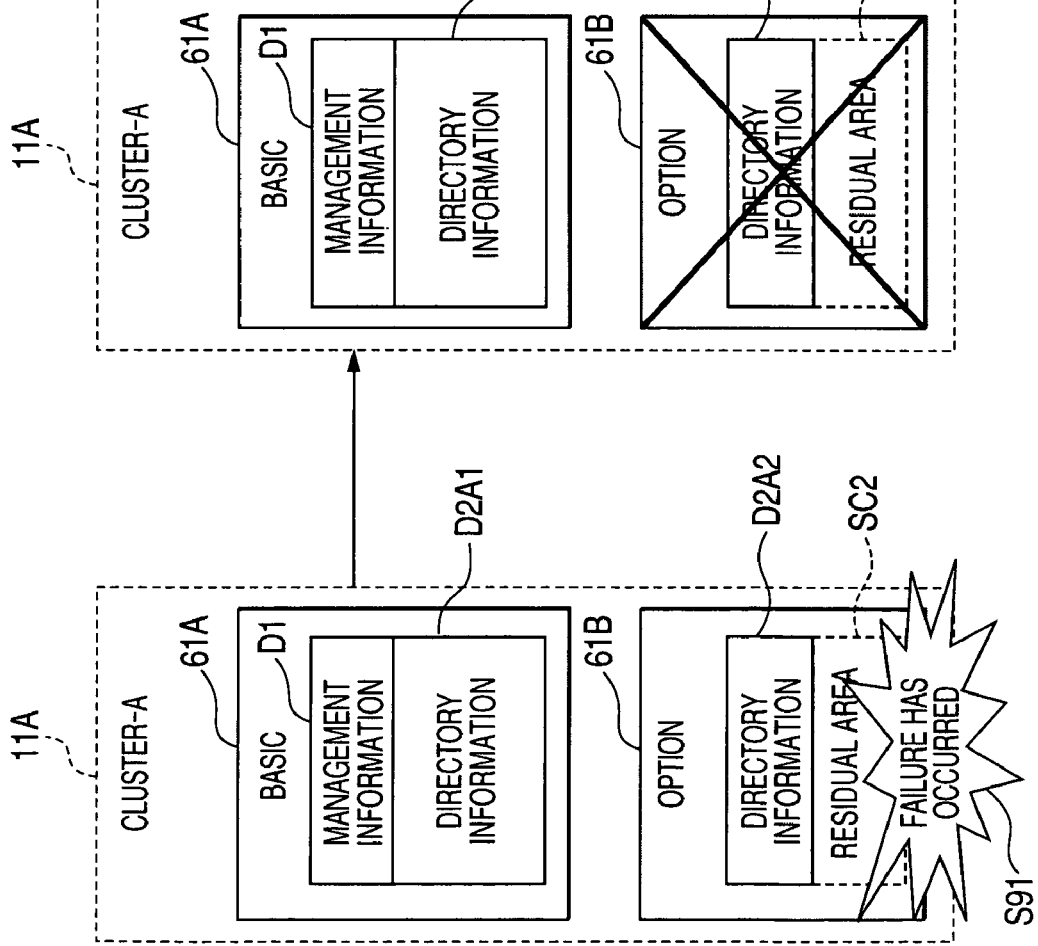

DISK ARRAY DEVICE AND MAINTENANCE METHOD FOR DISK ARRAY DEVICE

CROSS-REFERENCES TO RELATED APPLICATIONS

This application relates to and claims priority from Japanese Patent Application No. 2003-416230, filed on Dec. 15, 2003, the entire disclosure of which is incorporated herein by reference.

BACKGROUND OF THE INVENTION

1. Field of the Invention

The present invention relates to a disk array device and a maintenance method for the disk array device.

2. Description of the Related Art

A disk array device is established, for example, by arranging a large number of disk drives in array and on the basis of RAID (Redundant array of Independent Inexpensive Disks). A logical volume, which is a logical storage area, is formed on a physical storage area provided in each disk device. A host computer can read and write desired data by issuing a writing command or a reading command of a predetermined format to the disk array device.

Various preventive measures are applied to the disk array device in order to prevent loss or the like of data stored in the disk drives. One of the preventive measures is adoption of a RAID configuration. For example, the disk array device adopts a redundant storage configuration, which is known as RAID 1 to 6 or the like, whereby likelihood of data loss is reduced.

Moreover, duplexing of a physical configuration is also performed in the disk array device. For example, in the disk array device, duplexing is realized by providing plural principal parts such as host interface circuits, which perform data communication with a host computer, and subordinate interface circuits, which perform data communication with the respective disk drives. In addition, there are also provided plural paths for connecting the principal parts, respectively, plural power supplies for supplying power to the respective principal parts, and the like.

In addition, the conventional disk array device includes shared memories and cache memories such that control information is stored in the shared memories and data is stored in the cache memories (JP-A-2000-339101). In the conventional technique, both the shared memories and the cache memories are mounted in one memory package. Further, in order to supplement a cache capacity, cache memories are also mounted in a selector package.

User data, which has been requested by a host apparatus to be written in the disk drives but has not been written in the disk drives yet, is required to be stored in plural cache memories to be duplexed. This is for performing data guarantee. In addition, control information for controlling an operation or the like of the disk array device is also required to be duplexed from the viewpoint of securing redundancy. By duplexing the control information, even in the case in which one piece of control information becomes unavailable due to occurrence of a failure or the like, requests for reading and writing from the host apparatus can be processed on the basis of the other piece of control information.

However, with a configuration in which control memories storing control information and cache memories storing user data are provided in identical packages, in the case in which a failure occurs in a control memory or a cache memory, responsiveness declines during a period until maintenance and replacement work of an entire package, in which the failure has occurred, is completed.

In the case in which a writing request is received form the host apparatus in a normal state in which a failure has not occurred in both the packages, it is possible to inform the host apparatus of completion of writing at the point when data is stored in the cache memories. The data requested to be written is duplexed in the cache memories and guaranteed. Thus, no inconvenience is caused even if the host apparatus is informed of completion of writing before writing the data in the disk drives.

On the other hand, in the case in which entire one package is subjected to blocking processing, only the control memories and the cache memories mounted to the other package, which is operating normally, can be used. Therefore, in this case, since data cannot be guaranteed by duplexing, it is impossible to inform the host apparatus of completion of writing at the point when data requested to be written is stored in the single cache memory. Thus, in the case in which one of the packages is unavailable, the host apparatus is informed of completion of writing after the data requested to be written is written in the disk drives. This response operation is called, for example, a "pseudo through operation".

Even at the time of the pseudo through operation, the disk array device can continue operation normally. However, since response to the host apparatus is delayed, performance of the disk array device falls. The pseudo through operation continues throughout a period from the time when the package, in which a failure has occurred, is replaced until the time when necessary work is completed. Therefore, the pseudo through operation is performed over an entire period required for maintenance and recovery, and responsiveness of the disk array device falls.

SUMMARY OF THE INVENTION

It is an object of the present invention to provide a disk array device and a maintenance method for the disk array device, which, even in the case in which a failure has occurred in any one of control memories and cache memories, can perform maintenance and recovery work without affecting other memories. It is another object of the present invention to provide a disk array device and a maintenance method for the disk array device, which, even in the case in which a failure has occurred, can control decline in responsiveness. It is yet another object of the present invention to provide a disk array device and a maintenance method for the disk array device, which store control information in plural control memories, respectively, according to a type of the control information such that maintenance and recovery work can be performed using the control memories effectively. Other objects of the present invention will be apparent from a description of an embodiment to be described below.

BRIEF DESCRIPTION OF THE DRAWINGS

In the accompanying drawings:

FIGS. 8A to 8C are explanatory diagrams schematically showing a case in which a failure has occurred in a basic memory section in the first maintenance control mode;

FIGS. 9A to 9D are explanatory diagrams schematically showing a case in which a failure has occurred in an expanded memory section in the first maintenance control mode;

FIGS. 14A to 14C are explanatory diagrams schematically showing a case in which a failure has occurred again in a basic memory section in the second maintenance control mode;

FIGS. 15A to 15C are explanatory diagrams schematically showing a case in which a failure has occurred again in the expanded memory section in the second maintenance control mode;

FIGS. 17A to 17C are explanatory diagrams schematically showing a case in which a failure has occurred in an expanded memory section in the third maintenance control mode;

FIGS. 20A to 20C are explanatory diagrams schematically showing a case in which a failure has occurred again in a basic memory section in the third maintenance control mode; and FIGS. 21A to 21C are explanatory diagrams schematically showing a case in which a failure has occurred again in the expanded memory section in the third maintenance control mode.

DESCRIPTION OF THE PREFERRED EMBODIMENT

Figure 1:
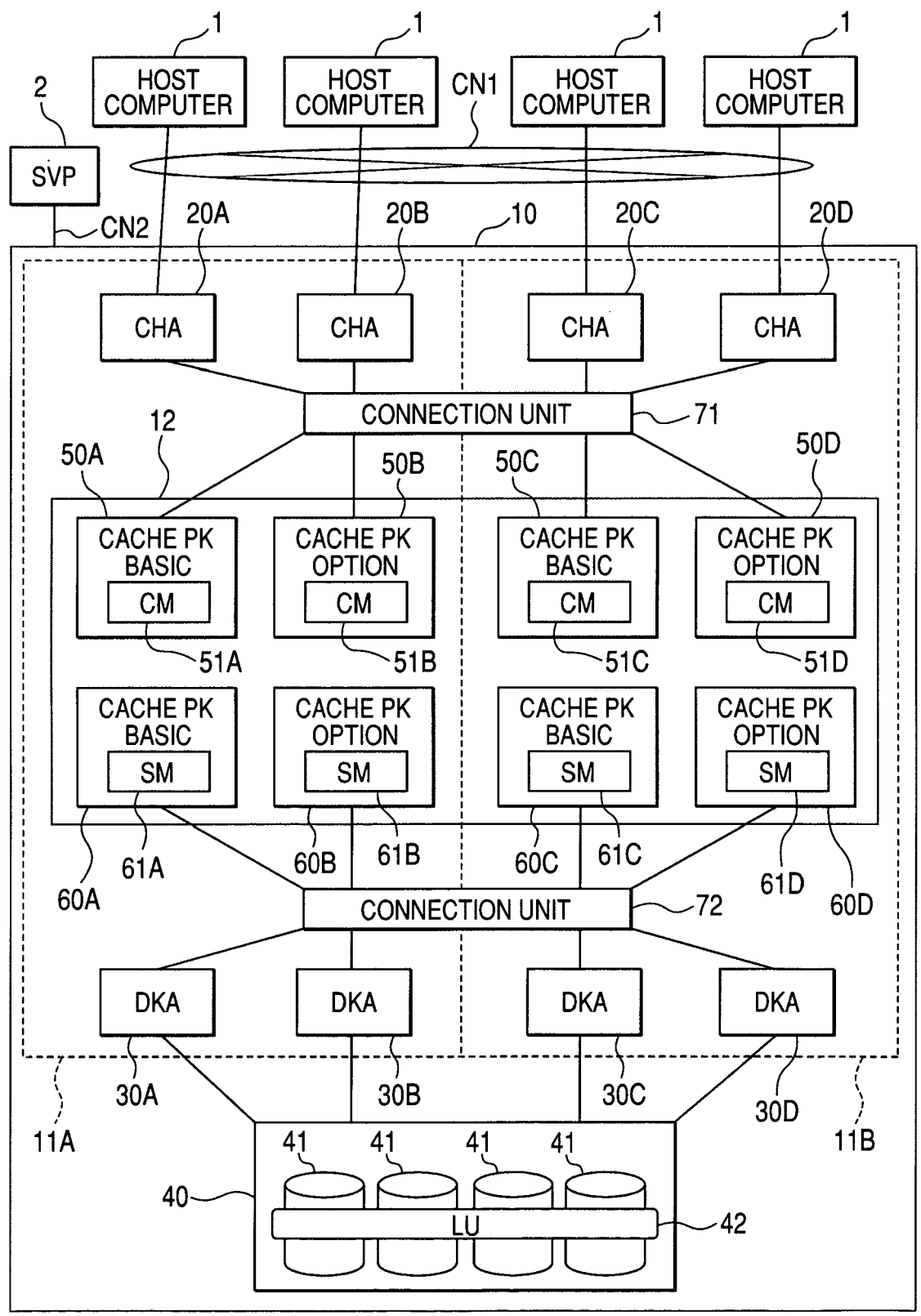
FIG. 1 is a block diagram showing a schematic structure of a disk array device in accordance with an embodiment of the present invention.

In order to solve the above-described problems, a disk array device in accordance with the present invention includes: channel adapters which control exchange of data with host apparatuses; disk adapters which control exchange of data with storage devices; cache memory packages having cache memories which are used by the channel adapters and the disk adapters and store data; and plural control memory packages having control memories which store control information. The control information includes first control information and second control information. Further, the first control information is stored in control memories different from each other, respectively, and duplexed, and the second control information is stored in another control memory which is different from the control memories storing the first control information, respectively.

Since the control memory packages and the cache memories packages are constituted as separate packages, even in the case in which a failure has occurred in any one of the packages, maintenance and recovery work can be performed independently without affecting the other packages. In addition, since the first control information is multiplexed to be managed, control information, which is used for controlling an operation of the disk array device, can be used as the first control information. Further, storage structure information concerning a storage structure of the cache memories can be used as the second control information.

In a first aspect of the present invention, there is provided a maintenance control unit which, in the case in which a failure has occurred in any one of the plural control memories, restores information stored in the control memory in which the failure has occurred. The maintenance control unit restores the information stored in the control memory, in which the failure has occurred, using storage areas of the control memories storing the first control information.

The control information as the first control information and the storage structure information as the second control information have technical characteristics that multiplexed management is required and multiplexed management is not required, respectively. In the event that the storage structure information becomes unavailable due to a failure or the like, the disk array device processes a writing request from the host apparatus while performing a pseudo through operation. However, in the case in which the storage structure information has recovered, the disk array device returns to a normal state, and the pseudo through operation stops. Here, the maintenance control unit can recover the second control information using the storage areas of the control memories storing the first control information. Therefore, the maintenance control unit can recover the second control information to return the disk array device to a normal operation with the pseudo through operation discontinued before the control memory storing the second control information is replaced with a normal product.

In an aspect of the present invention, in the case in which a failure has occurred in the control memory storing the second control information, the maintenance control unit restores the second control information by an amount which can be established in a free space of the control memory storing the first control information.

In addition, in an aspect of the present invention, the maintenance control unit restores information stored in a control memory, in which a failure has occurred, such that a structure of the control memory varies before and after the occurrence of the failure. In other words, the maintenance control unit can recover the information to a state in which data guarantee is possible rather than performing maintenance and recovery by forming a state identical with an initial state before the occurrence of the failure. Therefore, a period required for maintenance and recovery can be reduced.

In an aspect of the present invention, the maintenance control unit is adapted to execute at least one of (1) a first maintenance mode which is executable in the case in which no usable free space exists in the control memory storing the first control information, (2) a second maintenance mode which is executable in the case in which a usable free space exists a predetermined value or more in the control memory storing the first control information, and (3) a third maintenance mode which is executable in the case in which a usable free space exists less than the predetermined value in the control memory storing the first control information. (1) The first maintenance mode is a mode for, (1-1) in the case in which a failure has occurred in the control memory storing the first control information, if the control memory, in which the failure has occurred, has been replaced with a normal product, restoring the first control information by copying the first control information multiplexed in the other control memories to the replaced control memory, and (1-2) in the case in which a failure has occurred in the control memory storing the second control information, reestablishing the second control information overwriting the second control information on the control memory storing the first control information and, if the control memory, in which the failure has occurred, has been replaced with a normal product, reestablishing the second control information in the replaced control memory, and restoring the first control information by copying the first control information multiplexed in the other control memories to the control memory on which the second control information has been overwritten. (2) The second maintenance mode is a mode for, (2-1) in the case in which a failure has occurred in the control memory storing the first control information, if the control memory, in which the failure has occurred, has been replaced with a normal product, restoring the first control information by copying the first control information multiplexed in the other control memories to the replaced control memory, and (2-2) in the case in which a failure has occurred in the control memory storing the second control information, reestablishing the second control information in a free space of the control memory storing the first control information, and permitting replacement of the control memory, in which the failure has occurred, with a normal product. (3) The third maintenance mode is a mode for, (3-1) in the case in which a failure has occurred in the control memory storing the first control information, if the control memory, in which the failure has occurred, has been replaced with a normal product, restoring the first control information by copying the first control information multiplexed in the other control memories to the replaced control memory, and (3-2) in the case in which a failure has occurred in the control memory storing the second control information, partly reestablishing the second control information by a range which can be reestablished in a free space of the control memory storing the first control information and, if the control memory, in which the failure has occurred, has been replaced with a normal product, reestablishing a remaining part, which is not reestablished, of the second control information in the replaced control memory.

In addition, in an aspect of the present invention, a case in which another failure has occurred after restoration work was performed once is also considered. In other words, the maintenance control unit maintains a storage structure of a control memory related to information restoration work as it is and, in the case in which the second maintenance mode is executed, (2-1A) if a failure has occurred in the control memory storing the first control information, reestablishing the second control information in the replaced control memory, and if the control memory, in which the failure has occurred, has been replaced with a normal product, restoring the first control information by copying the first control information multiplexed in the other control memories to the replaced control memory and, (2-2A) if a failure has occurred in the replaced control memory, permitting replacement with a normal product.

Alternatively, the maintenance control unit maintains a storage structure of a control memory related to information restoration work as it is and, in the case in which the third maintenance mode is executed, (3-1A) if a failure has occurred in the control memory storing the first control information, reestablishing the second control information in the replaced control memory and, if the control memory, in which the failure has occurred, has been replaced with a normal product, restoring the first control information by copying the first control information multiplexed in the other control memories to the replaced control memory, and (3-2A) if a failure has occurred in the replaced control memory, permitting replacement with a normal product and, if the control memory has been replaced with a normal product, reestablishing the remaining part of the second control information in the replaced control memory.

Moreover, in an aspect of the present invention, in the case in which the third maintenance mode is executed, the maintenance control unit limits a used area of the cache memories to a range which is manageable by the second control information which is partly reestablished in a free space of the control memory storing the first control information.

An embodiment of the present invention will be hereinafter described with reference to FIGS. 1 to 21. In this embodiment, a disk array device provided with plural clusters is disclosed. Each cluster includes: channel adapters which control exchange of data with host apparatuses; disk adapters which control exchange of data with storage devices; cache memory packages which is mounted with cache memories; basic control memory packages which are mounted with basic control memories storing control information concerning a device configuration and a device operation; and expanded control memory packages which is mounted with expanded control memories storing directory information concerning a storage structure of the cache memories. Further, the control information is multiplexed by the respective basic control memories of the respective clusters and stored therein.

In addition, in this embodiment, a maintenance method for a disk array device is disclosed. In short, there is disclosed a maintenance method for a disk array device including: channel adapters which control exchange of data with host apparatuses; disk adapters which control exchange of data with storage devices; plural cache memories which are used by the channel adapters and the disk adapters and store data, respectively; plural first control memories which are used by the channel adapters and the disk adapters and store management information concerning a device configuration and a device operation, respectively; and plural second control memories which are used by the channel adapters and the disk adapters and store storage structure information concerning a storage structure of the respective cache memories, respectively, wherein the management information is stored in the respective first control memories and multiplexed, the maintenance method including: a failure detection step of detecting whether or not a failure has occurred in any one of the first control memories and the second control memories; and a maintenance step of, in the case in which a failure is detected, restoring information stored in the control memory, in which the failure has occurred, using storage areas of the first control memories.

FIG. 1 is a block diagram showing a schematic structure of a disk array device 10. The disk array device 10 is connected to plural host computers 1 via a communication network CN1 so as to be able to communicate with the plural host computers 1 bi-directionally. Here, the communication network CN1 is, for example, a LAN (Local Area Network), a SAN (Storage Area Network), or the Internet. In the case in which the LAN is used, data transfer between the host computers 1 and the disk array device 10 is performed in accordance with the TCP/IP (Transmission Control Protocol/Internet Protocol). In the case in which the SAN is used, the host computers 1 and the disk array device 10 perform data transfer in accordance with the fiber channel protocol. In addition, in the case in which the host computers 1 are mainframes, data transfer is performed in accordance with a communication protocol such as FICON (Fibre Connection: registered trademark), ESCON (Enterprise System Connection: registered trademark), ACONARC (Advanced Connection Architecture: registered trademark), or FIBARC (Fibre Connection Architecture: registered trademark).

The respective host computers 1 are realized as, for example, a server, a personal computer, a workstation, or a mainframe. For example, the respective host computers 1 are connected to plural client terminals, which are located outside the figure, via another communication network. The respective host computer 1, for example, perform reading and writing of data with respect to the disk array device 10 in response to a request from the respective client terminals to thereby provide the respective client terminals with services.

The disk array device 10 includes, as described later, plural channel adapters (hereinafter abbreviated as CHAs) 20A to 20D, plural disk adapters (hereinafter abbreviated as DKAs) 30A to 30D, plural disk drives 41, plural cache packages 50A to 50D and 60A to 60D, and connection units 71 and 72. In addition, two clusters 11A and 11B are formed in the disk array device 10. The respective clusters 11A and 11B basically have an identical physical structure. However, data and the like, which are managed by the clusters 11A and 11B, respectively, may be different.

The CHAs 20A to 20D and the DKAs 30A to 30D include, for example, a printed board mounted with a processor, a memory, and the like and a control program stored in a memory, respectively, and are adapted to realize predetermined functions according to cooperation of the hardware and the software.

In the following description, in the case in which the individual elements are not specifically distinguished, the elements are described using reference numerals with the affixed alphabets omitted in such a manner as "CHA 20", "DKA 30", "cache package 50", "cache package 60", "cache memory 51", and "shared memory 61".

The disk array device 10 is provided with plural, for example, four or eight CHAs 20. The respective CHAs 20 such as CHAs for an open system and CHAs for a mainframe system are prepared according to a type of the host computers. The respective CHAs 20 control data transfer to and from the host computers 1. The respective CHAs 20 include a processor unit, a data communication unit, and a local memory unit (all of which are not shown).

The respective CHAs 20 receive commands, which request reading and writing of data, and data from the host computers 1, which are connected to the respective CHAs 20, and operate in accordance with the commands received from the host computers 1. First, operations of the CHA 20 and the DKA 30 will be described. For example, when a reading request for data is received from the host computer 1, the CHA 20 stores a reading command in the shared memory 61. The DKA 30 refers to the shared memory 61 at any time and, when an unprocessed reading command is found, reads out data from the disk drive 41 and stores the data in the cache memory 51. The CHA 20 reads out the data transferred to the cache memory 51 and sends the data to the host computer 1 which issued the command.

In addition, for example, when a writing request for data is received from the host computer 1, the CHA 20 stores a writing command in the shared memory 61 and stores the received data (user data) in the cache memory 51. Here, since the data requested by the host computer 1 to be written is "dirty data" which is not written in the disk drive 41, the data is stored in the plural cache memories 51 and multiplexed. After storing the data in the cache memory 51, the CHA 20 informs the host computer 1 of completion of writing. Then, the DKA 30 reads out the data stored in the cache memory 51 in accordance with the writing command stored in the shared memory 61 and stores the data in the predetermined disk drive 41. An attribute of the data written in the disk drive 41 changes from the "dirty data" to "clean data", and the data is released from multiplexed management by the cache memory 51.

Here, in this specification, the "dirty data" means data which is not written in the disk drive 41 and for which multiplexed management by the plural cache memory 51 is requested. In addition, in this embodiment, the "clean data" means data which is written in the disk drive 41 and for which multiplexed management by the plural cache memories 51 is not requested.

The plural, for example, four or eight DKAs 30 are provided in the disk array device 10. The respective DKAs 30 control data communication with the respective disk drives 41 and include processor units, data communication units, and local memories, and the like (all of which are not shown). The respective DKAs 30 and the respective disk drives 41 are connected via a communication network such as a SAN and perform data transfer by a unit of block in accordance with a fiber channel protocol. The respective DKAs 30 watch states of the respective disk drives 41, and results of the watching are sent to an SVP 2 via an internal network.

The disk array device 10 includes a storage 40. The storage 40 includes the plural disk drives 41. The respective disk drives 41 can be realized as, for example, a hard disk drive (HDD) or a semiconductor memory device. The storage 40 does not need to be provided inside the disk array device 10 but may exist outside the disk array device 10. In addition, the storage 40 does not need to be peculiar to the disk array device 10 but may be an old type storage or a storage of other companies. In the case in which the storage 40 is manufactured by other companies, the storage 40 can be mapped to a logical device (LDEV) or a virtual device (VDEV) provided under the logical device and used as if the storage 40 is a storage of the disk array device 10 itself.

Here, for example, one RAID group can be constituted by the four disk drives 41. The RAID group is a disk group which realizes redundant storage of data in accordance with, for example, RAID 5 (not limited to RAID 5). At least one logical volume 42 (LU or LDEV), which is a logical storage area, can be set on a physical storage area provided by each RAID group.

A memory unit 12 includes the plural cache packages 50 and 60. One cache package 50 is mounted with the cache memory 51 and the other cache package 60 is mounted with the shared memory 61. Therefore, it is also possible to refer to the other cache package 60 as a shared memory package or a control memory package. Here, data is stored in the cache memory 51. Control information is stored in the shared memory 61. The shared memory 61 is preferably a nonvolatile memory. In addition, the cache memory 51 can be constituted as a nonvolatile memory as well. As described later, in this embodiment, the control information is classified and managed on the basis of attributes of the control information taking notice of technical characteristics of the control information.

In addition, the cache packages 50 and 60 are classified into a basic memory unit ("Basic" in the figure) and an expanded memory unit ("Option" in the figure). As an example, the basic memory unit is mounted to the disk array device 10 as standard, and the expanded memory unit is an optional component to be added as required. The basic memory unit and the expanded memory unit include the cache package 50 mounted with the cache memory 51 and the cache package 60 mounted with the shared memory 61, respectively.

The basic memory unit and the expanded memory unit are provided for each of the clusters 11A and 11B. The basic memory unit of the cluster 11A includes the cache package 50A and the cache package 60A, and the expanded memory unit of the cluster 11A includes the cache package 50B and the cache package 60B. The basic memory unit of the cluster 11B includes the cache package 50C and the cache package 60C, and the expanded memory unit of the cluster 11B includes the cache package 50D and the cache package 60D. Therefore, the clusters 11A and 11B include the two cache memories 51 and the two shared memories 61, respectively.

The connection unit 71 connects the respective CHAs 20 and the respective cache packages 50 and 60. The connection unit 72 connects the respective DKAs 30 and the respective cache packages 50 and 60. Consequently, all the CHAs 20 and the DKAs 30 are accessible to all the cache packages 50 and 60, respectively.

The SVP (Service Processor) 2 is a computer device for managing and watching the disk array device 10. The SVP 2 collects various kinds of environmental information, performance information, and the like from the respective CHAs 20, the respective DKAs 30, and the like via an internal network such as a LAN provided in the disk array device 10. Examples of information to be collected by the SVP 2 include a device configuration, a power supply alarm, a temperature alarm, and an input/output speed (IOPS). A system administrator can perform setting of a RAID configuration, blocking processing of various packages (CHA, DKA, disk drive, etc.), and the like via a user interface provided by the SVP 2.

Figure 2:
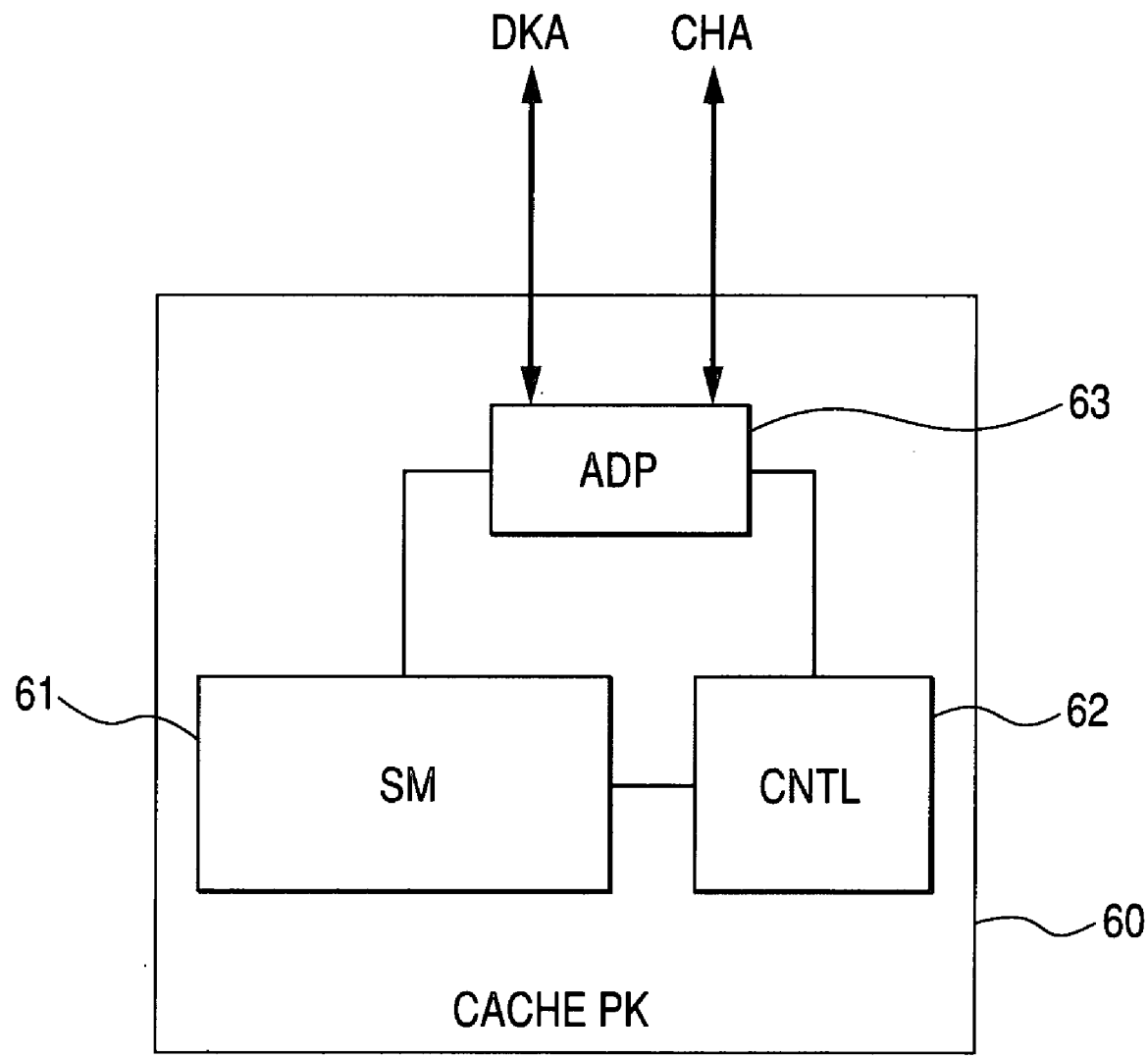
FIG. 2 is a block diagram showing a schematic structure of a cache package.

FIG. 2 shows a schematic structure of the cache package 60. The cache package 60 for control includes, for example, the shared memory 61, the memory control circuit ("CTRL") 62, and the adapter ("ADP" in the figure) 63. The shared memory 61 includes, for example, at least one nonvolatile memory module detachably mounted to a memory slot. The memory control circuit 62 controls, for example, writing of data in the shared memory 61 and reading-out of data from the shared memory 61. The adapter 63 is connected to, for example, the respective CHAs 20 and the respective DKAs 30 via the connection units 71 and 72, respectively. Note that, although not shown, the cache package 50 also includes the cache memory 51, a memory control circuit, and an adapter in the same manner as described above.

As described above, in this embodiment, the total four shared memories 61 for storing control information are provided. Here, the control information can be classified into, for example, management information and directory information. It is possible to define the management information in this specification as, for example, control information necessary for controlling a device configuration, a device operation, and the like of the disk array device 10. Therefore, the management information is required to be multiplexed and managed. Although the management information is managed in the clusters 11A and 11B, respectively, the management information controls an operation and the like of the entire device and does not depend upon a cluster. Contents of the management information, which exists in the separate clusters, respectively, are managed so as to coincide with each other.

On the other hand, the directory information in this specification can be defined as, for example, control information indicating a storage structure and the like of the cache memory 51 or control information for managing information on the cache memory 51. The cache memory 51 is provided by a unit of cluster, and contents stored therein depend upon a cluster. In other words, if the cluster is different, data stored in the cache memory 51 can also be different. Further, contents of the directory information depend upon contents stored in the cache memory 51. Therefore, unlike the case of the management information, there is little necessity to multiplex the directory information across the clusters.

Figure 3A:
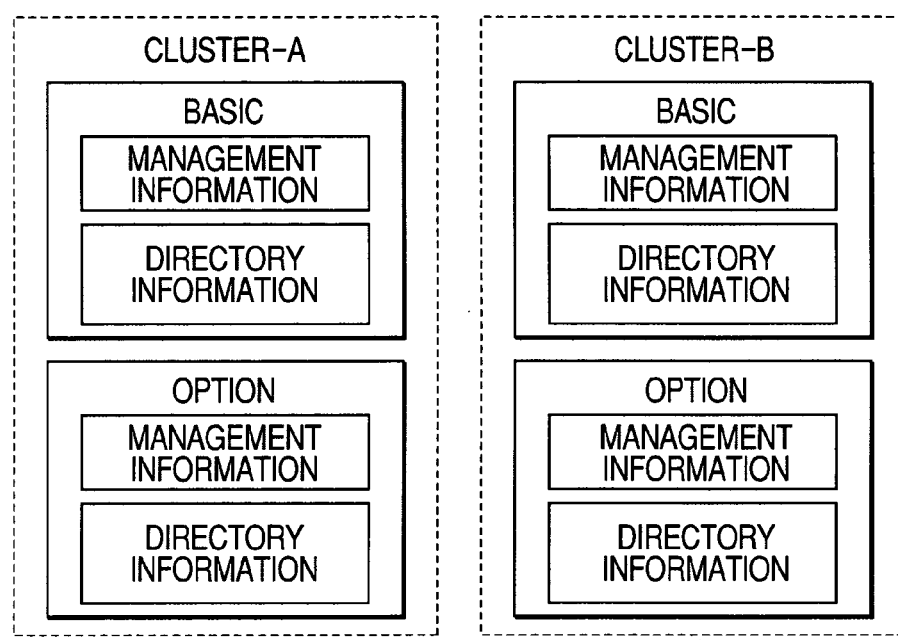
FIG. 3A is an explanatory diagram showing an example of storing control information in plural shared memories in the case in which identical information is held in all the shared memories.

On the basis of the above-mentioned knowledge, a method of using the total four shared memories will be examined. First, as shown in FIG. 3A, it is possible that management information and directory information are stored in all the four shared memories to fully duplex a configuration of the shared memories. For example, the management information is controlled to have identical contents in all the four shared memories (quadruplexing). In addition, for example, the directory information is duplexed in the respective clusters.

However, in this case, it is necessary to update all four pieces of management information, respectively, and update two pieces of directory information, respectively, in the clusters every time I/O processing (writing request processing and reading request processing) is performed. Therefore, in the case in which the configuration of the shared memory is fully duplexed, up dating load of the control information is increased.

Figure 3B:
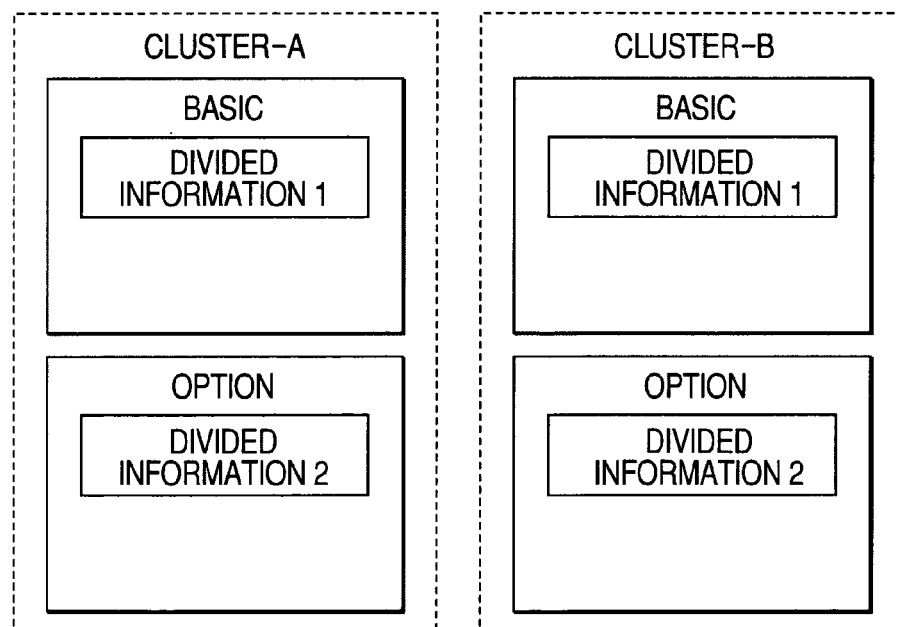
FIG. 3B is an explanatory diagram showing an example of storing control information in plural shared memories in the case in which the control information is divided and held in the plural shared memories.
Figure 4A:
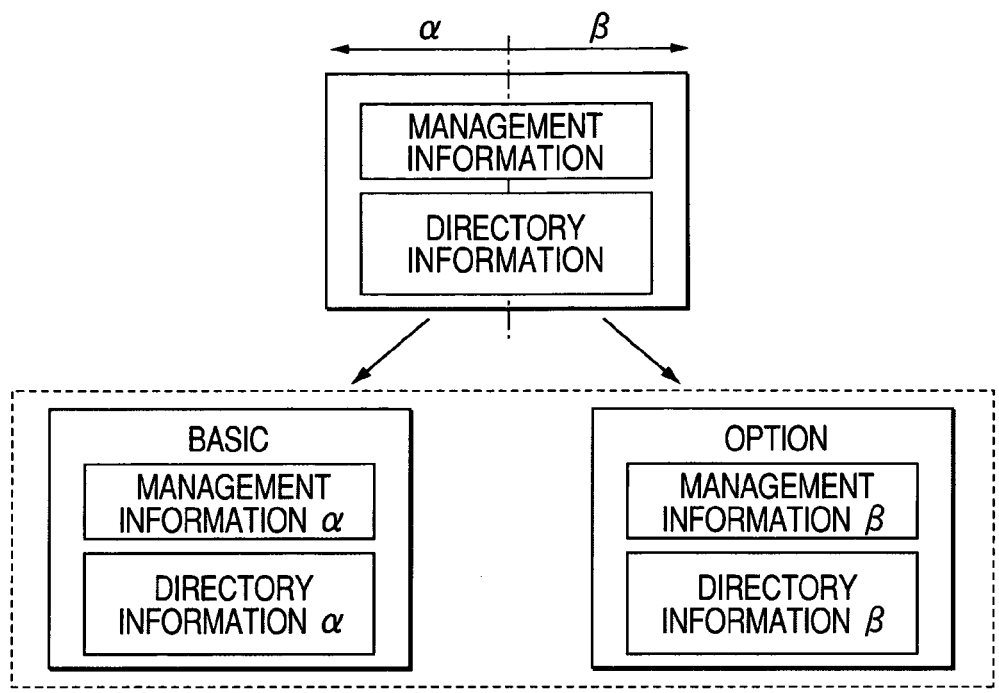
FIGS. 4A and 4B are explanatory diagrams showing the example shown in FIG. 3B, in which the control information is divided, more in detail.
Figure 4B:
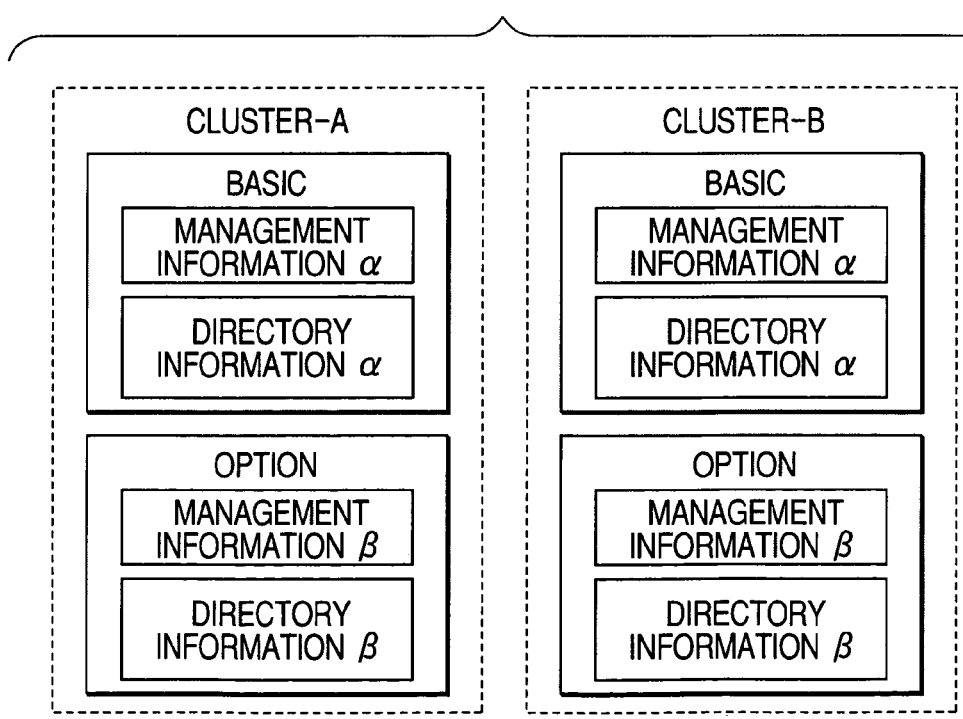

Thus, next, as shown in FIG. 3B, it is possible that the control information is divided and stored in the shared memories. In FIG. 3B, the control information is divided into "divided information 1" and "divided information 2". FIGS. 4A and 4B show contents of FIG. 3B more specifically. As shown in FIG. 4A, one piece of management information is divided into "management information α" and "management information β", and one piece of directory information is divided into "directory information α" and "directory information β". Then, for example, the "management information α" and the "directory information α" are stored in the shared memory of the basic memory unit in an identical cluster, and the "management information β" and the "directory information β" is stored in the expanded memory unit therein. FIG. 4B shows an overall structure of the four shared memories. In this case, an effect of redundancy can be improved. However, a redundant configuration always has to be secured for both the management information α and the management information β. Therefore, the memory control circuits of the shared memories are required to always perform duplex writing processing in order to duplex the management information α and the management information β. Thus, further improvement of performance of the entire disk array device cannot be expected.

Figure 5A:
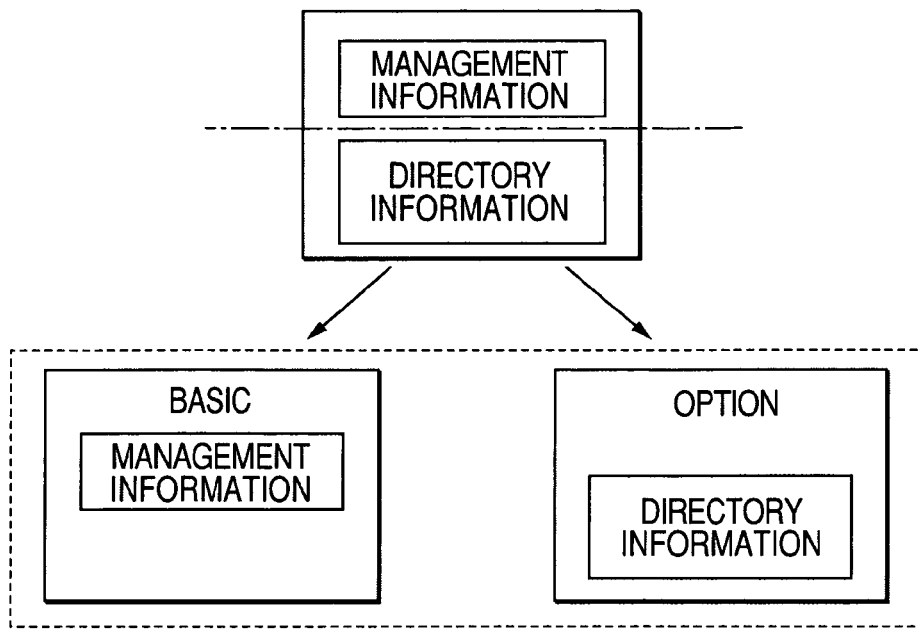
FIGS. 5A and 5B are explanatory diagrams showing a state in which control information is divided into control information and directory information and stored in shared memories.
Figure 5B:
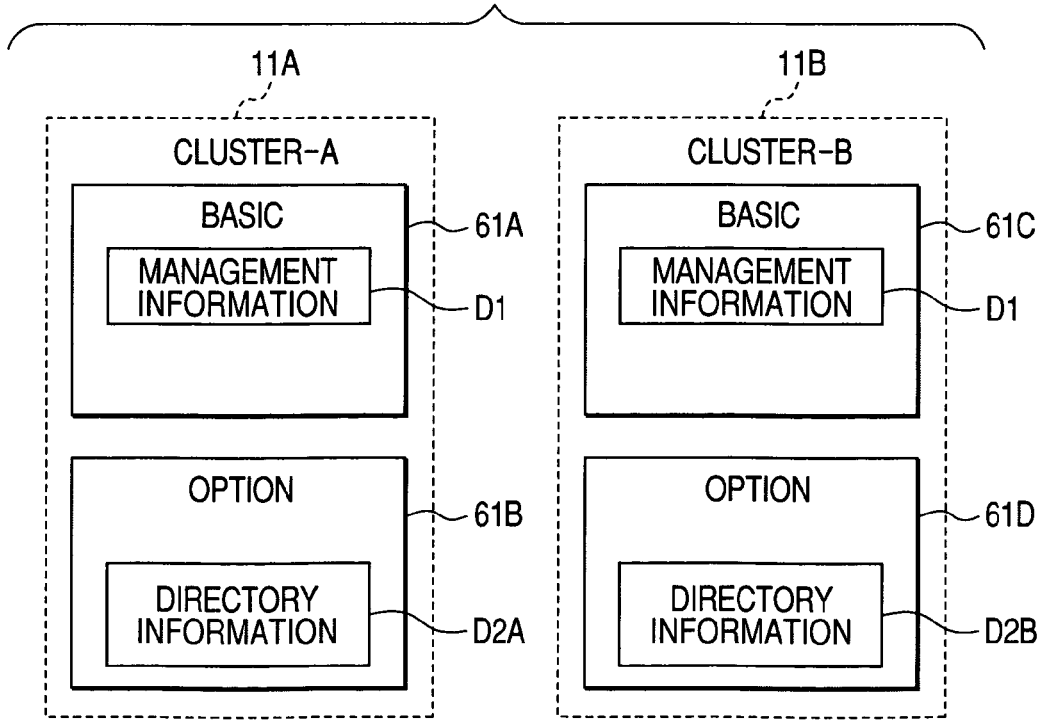

FIGS. 5A and 5B schematically show a state in which the control information is divided into "management information" and "directory information" and stored in the plural shared memories 61A to 61D, respectively. In one cluster 11A, management information D1 is stored in the shared memory 61A of the basic memory unit, and directory information D2A is stored in the shared memory 61B of the expanded memory unit. Similarly, in the other cluster 11B, management information D1 is stored in the shared memory 61C of the basic memory unit, and directory information is stored in the shared memory 61D of the expanded memory unit. Here, the management information D1 and the management information D1 managed by the clusters 11A and 11B, respectively, have identical contents. In other words, the management information D1 is duplexed. The directory information D2A and the directory information D2B managed by the clusters 11A and 11B, respectively, have contents peculiar to the clusters 11A and 11B. In other words, the directory information D2A and the directory information D2B (hereinafter referred to as "directory information D2" if not distinguished) are not duplexed.

In the respective shared memories 61A and 61C, since duplexing of the management information D1 is always performed, load on the memory control circuits is equivalent to the case shown in FIG. 4. However, since the directory information D2A and the directory information D2B are not managed in duplex, load on the memory control circuits of the shared memories 61B and 61D can be reduced. In addition, since the control information is divided into the management information D1 and the directory information D2A and the directory information D2B on the basis of attributes of the information and stored in the separate shared memories, respectively, simplification of maintenance work or the like can also be realized.

Figure 6:
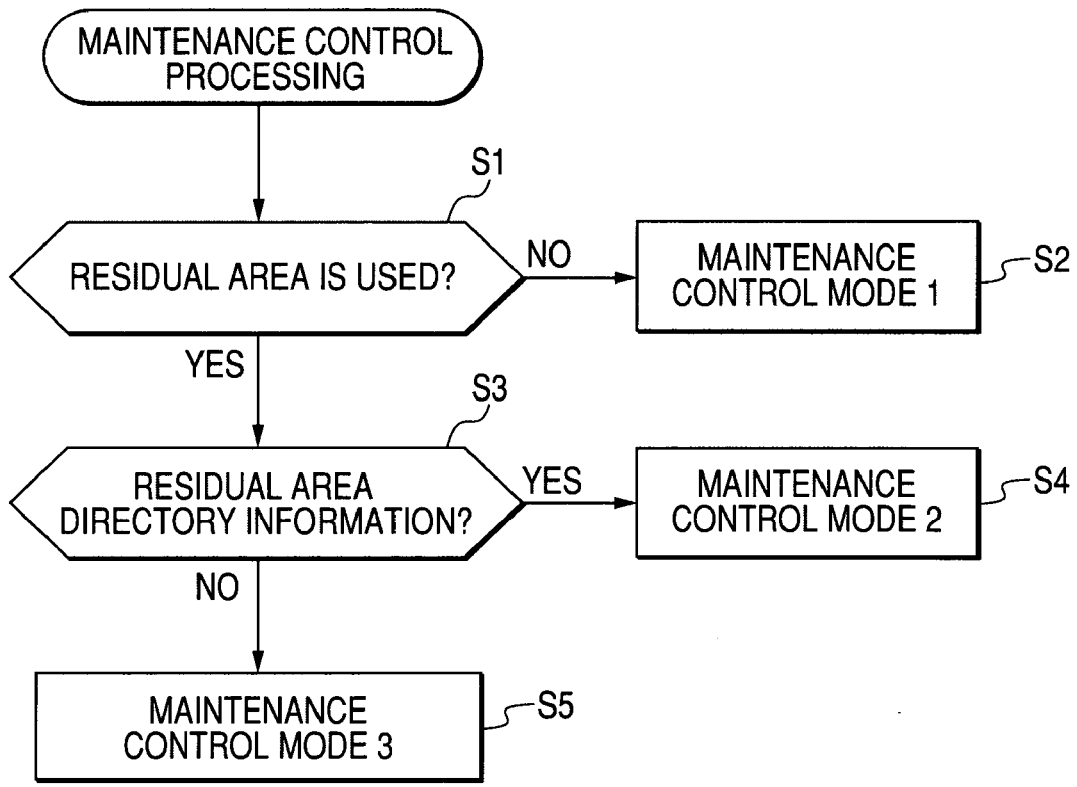
FIG. 6 is a flowchart indicating that a maintenance control mode can be set according to a size of a residual area.

Next, FIG. 6 is a flowchart schematically showing a selection method for a maintenance control mode according to this embodiment. In this embodiment, one maintenance control mode can be selected out of three kinds of maintenance control modes. In this embodiment, a maintenance control mode is determined in advance, for example, at the time of delivery from a factory on the basis of a size of a residual area of a shared memory to be described later. Therefore, the flowchart shown in FIG. 6 is not executed by the disk array device 10. However, the present invention is not limited to this, and the disk array device 10 may be constituted so as to be able to switch maintenance control modes via the SVP 2.

In this embodiment, there are provided three kinds of modes, namely, a first maintenance control mode (illustrated as "maintenance control mode 1"), a second maintenance control mode (illustrated as "maintenance control mode 2"), and a third maintenance control mode (illustrated as "maintenance control mode 3"). The first maintenance control mode is a mode of not using a residual area of the shared memories (61A, 61C) storing the management information D1. The second maintenance control mode is a mode of, in the case in which a size of a residual area is equal to or larger than a size of directory information, reestablishing the directory information using the residual area. The third maintenance control mode is a mode of, in the case in which a size of a residual area is smaller than a size of directory information, reestablishing the directory information using the residual area. Here, the residual area (free space) means a storage area which is not used in the case in which the disk array device 10 is operating normally but is used for, in the case in which a failure has occurred in a shared memory, recovery from the failure. More specifically, an unused storage area other than the storage area storing the management information D1 and/or an unused storage area other than the storage area storing the directory information D2 corresponds to the "residual area". The residual area will be further described later.

As shown in FIG. 6, in the case in which a residual area is not used (S1: NO), the first maintenance control mode is selected (S2). In the case in which the residual area is used (S1: YES), if a size of the residual area is equal to or larger than a size of directory information (S3: YES), the second maintenance control mode is selected (S4). In the case in which the size of the residual area is smaller than the size of the directory information (S3: NO), the third maintenance control mode is selected. As described above, since the size of the residual area has already been decided according to a memory size or the like of the shared memory 61, it is set in advance which maintenance control mode is used. Therefore, for example, the flowchart shown in FIG. 6 is used as a guidepost for selecting a maintenance control mode, and is not always executed as a computer program.

First maintenance control mode

An outline of the first maintenance control mode will be described with reference to FIG. 7 to FIGS. 9A to 9D. FIGS. 8A to 8C and FIG. 9A to 9D are explanatory diagrams schematically showing a part of schematic processing of this mode with one cluster 11A as a main subject. A description of the other cluster 11B will be omitted because the same operation is performed in the case of the other cluster 11B. Note that the respective maintenance control modes described below are executed by the disk array device 10. More specifically, for example, maintenance control can be executed according to cooperation of the CHA 20, the DKA 30, the SVP 2, the memory control circuit 62, and the like. However, the present invention is not limited to this, and a processor for maintenance control processing may be mounted to cause the processor for maintenance control processing to execute the maintenance control.

First, the disk array device 10 watches whether or not a failure has occurred in the shared memory 61 (S11). For example, in the case in which a writing error, a reading error, or the like with respect to the shared memory 61 is detected by the memory control circuit 62, it can be judged that a failure has occurred in the shared memory 61.

In the case in which occurrence of a failure in the shared memory 61 is detected (S11: YES), the disk array device 10 judges whether or not a failure has occurred in the shared memory 61 on the memory basic unit (Basic) side, that is, whether or not a failure has occurred in the management information D1 (S12). Note that, actually, it is possible to execute steps S11 and S12 without distinguishing the steps in order to immediately find in which shared memory 61 the failure has occurred at the point when the occurrence of the failure is detected.

As shown in FIG. 8A, in the case in which a failure has occurred in the shared memory 61 (61A or 61C) of the basic memory unit (S12: YES), the disk array device 10 performs maintenance blocking processing for a cache package (abbreviated as "substrate" in the figure) in which the failure has occurred (S13). In the case in which a failure has occurred in the shared memory 61A, maintenance blocking for the cache package 60A is performed. In the case in which a failure has occurred in the shared memory 61C, maintenance blocking for the cache package 60C is performed. Note that, even in the case in which a failure has occurred in one piece of management information D1, the disk array device 10 can be operated normally according to the other piece of management information D1.

After the maintenance blocking processing for the cache package 60, in which the failure has occurred, is performed, the system administrator takes out the cache package, in which the failure has occurred, from the disk array device 10 and replaces the cache package 60 with a normal cache package 60. When the replacement of the cache package 60 is confirmed (S14: YES), the disk array device 10 copies the management information D1 managed on the other side to the shared memory 61 mounted to the replaced cache package 60 (S15). The management information managed on the other side means management information managed in a normal cluster separate from a cluster in which a failure has occurred. In the example shown in FIG. 8, the management information D1 stored in the shared memory 61C of the cluster 11B is copied to the shared memory 61A of the replaced cache package 60A. As shown in steps S11 to S15 of FIG. 7 and in FIGS. 8A to 8C, in the first maintenance control mode, in the case in which a failure has occurred in the shared memory 61 storing the management information D1, maintenance blocking processing and data recovery processing are performed without affecting the shared memory 61 storing directory information at all.

On the other hand, in the case in which a failure has occurred in the shared memory 61 (61B or 61D) on the expanded memory unit (Option) side, that is, in the case in which a failure has occurred in the directory information D2 (S12: NO), the cache memory 51 corresponding to the directory information D2, in which the failure has occurred, cannot be used. Therefore, in the case in which data is written from the host computer 1 under this situation, a pseudo through operation is started (S16). As described above, the pseudo through operation is an operation for informing the host computer 1 of completion of writing after storing data from the host computer 1 in the disk drive 41. Therefore, responsiveness of the disk array device 10 declines during a period of the pseudo through operation.

In the case in which a failure has occurred in the shared memory 61 storing the directory information D2, as shown in FIG. 9B, the directory information D2 is reestablished by overwriting on the shared memory 61 of the basic memory unit storing management information (S17). The directory information D2 can be obtained by reading out the directory structure or the like of the cache memory 51 corresponding to the directory information D2, in which the failure has occurred, again. The directory information D2, which is obtained again, is stored in the shared memory 61 of the basic memory unit by overwriting. Therefore, the management information D1 is lost in the shared memory 61 on which the directory information D2 is overwritten. In the case shown in FIGS. 9A to 9D, the directory information D2A stored in the shared memory 61B in an initial state is stored in the storage area of the shared memory 61A by overwriting. Note that, since the management information D1 is duplexed, even in the case in which one piece of management information D1 is lost due to overwriting of the directory information D2, the disk array device 10 can be operated normally according to the other piece of management information D1.

Until the reestablishment of the directory information D2 is completed (S18: NO), a writing request from the host computer 1 is processed in a pseudo through operation mode. In the case in which the CHA 20 has received the writing request from the host computer 1, the CHA 20 informs the host computer 1 of completion of writing after confirming that the DKA 30 has stored requested data in the disk drive 41.

When the reestablishment of the directory information D2 in the shared memory 61 of the basic memory unit is completed (S18: YES), the pseudo through operation mode is stopped (S19). This is because, through the reestablishment of the directory information D2, the cache memory 51 becomes available again, and the data (dirty data) which is requested by the host computer 1 to be written can be duplexed by the cache memory 51 of the basic memory unit and the cache memory 51 of the expanded memory unit. When the pseudo through operation mode is cancelled, the CHA 20 informs the host computer 1 of completion of writing at the point when the data received from the host computer 1 is duplexed by the respective cache memories 51 (51A and 51B or 51C and 51D). Therefore, responsiveness of the disk array device 10 is recovered to responsiveness at the normal time.

After the maintenance blocking processing for the cache package 60 of the expanded system unit, in which the failure has occurred, is performed (S20), the cache package 60, in which the failure has occurred, has been replaced with a normal cache package 60 by the system administrator. When the replacement of the cache package 60, in which the failure has occurred, is confirmed (S21: YES), the disk array device 10 reestablishes the directory information D2 again in the shared memory 61 mounted to the replaced cache package 60 (S22). A method of copying the directory information D2 reestablished in the shared memory 61 of the basic memory unit to the shared memory 61 of the replaced expanded memory unit is also possible. However, it is desirable to reestablish the directory information D2 again on the basis of latest stored contents of the cache memory 51. During a period in which the directory information D2 is reestablished in the shared memory 61 mounted to the replaced normal cache package 60, duplexing processing or the like of the data is performed using the directory information D2 reestablished by overwriting in step S17.

When the directory information D2 is reestablished in the shared memory 61 of the cache package 60 of the replaced expanded memory unit (S23: YES), the disk array device 10 switches a reference for the directory information D2 from the shared memory 61 of the basic memory unit to the shared memory 61 of the expanded memory unit (S24). Then, the disk array device 10 deletes the directory information D2 from the shared memory 61 of the basic memory unit (S25) and, as shown in FIG. 9D, copies the management information D1 managed in the other cluster to the shared memory 61 of the basic memory unit (S26).

As described above, in the first maintenance control mode, in the case in which a failure has occurred in the shared memory 61 of the expanded memory unit, the shared memory 61 of the basic memory unit is used as a work area, whereby the directory information D2 is reestablished at an early stage. Therefore, the pseudo through operation mode can be cancelled before the cache package 60, in which a failure has occurred, is replaced with a normal product, and a period of the pseudo through operation mode can be reduced. Consequently, responsiveness of the disk array device 10 at the time of occurrence of a failure can be improved.

Second maintenance control mode

Next, an outline of the second maintenance control mode will be described with reference to FIG. 10 to FIGS. 15A to 15C. As described later, in the second maintenance control mode, processing in the case in which a new failure has subsequently occurred after first maintenance control was performed is also considered.

Figure 10:
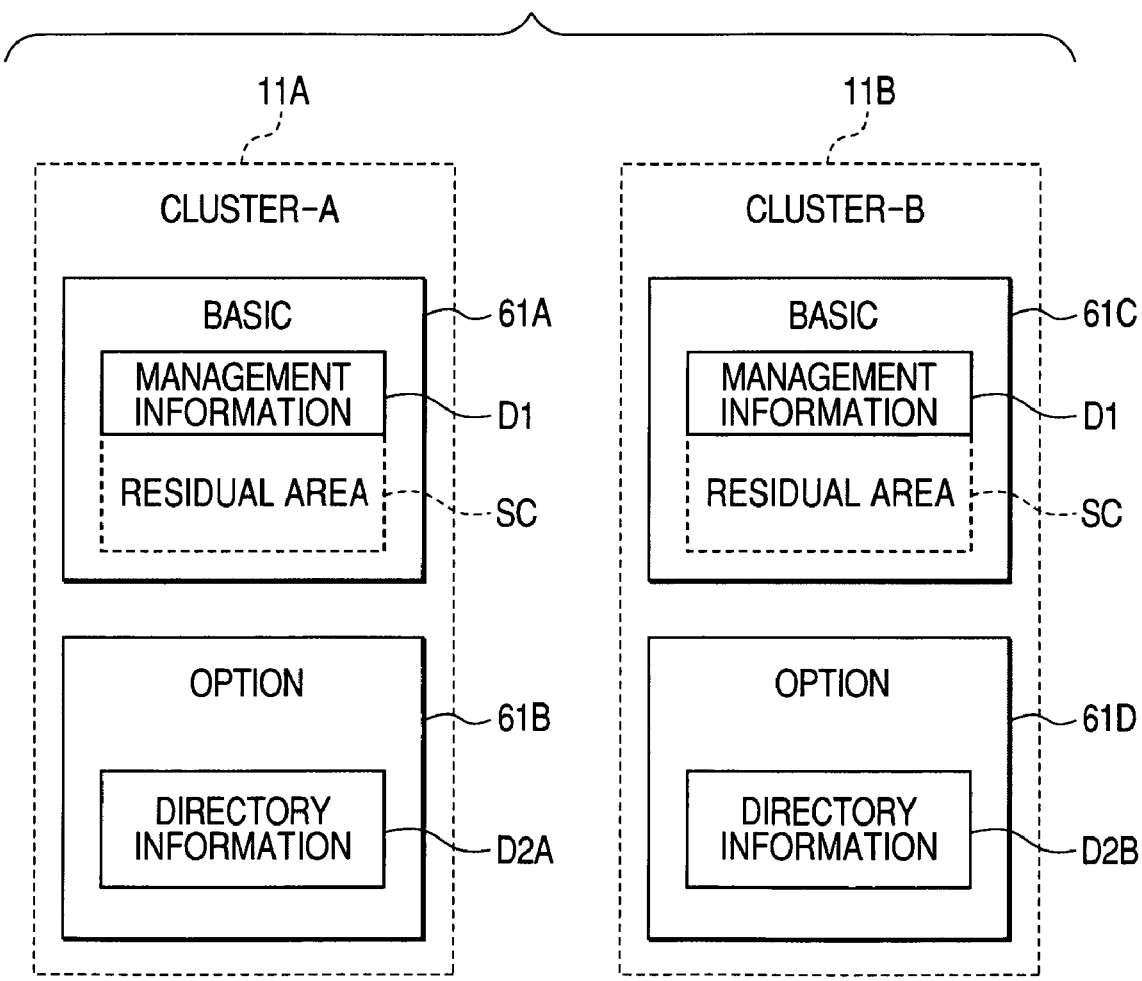
FIG. 10 is an explanatory diagram showing a relation among management information, directory information, and a residual area.

A residual area of the shared memory 61 will be described with reference to FIG. 10. Depending upon a memory size of the shared memory 61, a data size of the management information D1, and the like, an unused storage area can be generated at least in apart of the shared memory 61. For example, a residual area SC is generated in the shared memory 61A of the basic memory unit in the cluster. 11A. In addition, a residual area SC is also generated in the shared memory 61C of the basic memory unit in the cluster 11B. Sizes of both the residual areas SC are identical. In the second maintenance control mode and the third maintenance control mode which is described alter, the residual areas SC are used as a work area to be used for recovery from a failure, respectively. Note that a residual area can also be generated in the shared memories 61B and 61D of the expanded memory unit. In the following description, a reference sign "SC1" may be affixed to the residual area of the basic memory unit and a reference sign "SC2" may be affixed to the residual area of the expanded memory unit to distinguish both the residual areas. In addition, for example, in the case in which both the residual areas are not specifically distinguished, a reference sign "SC" is simply affixed.

Figure 7:
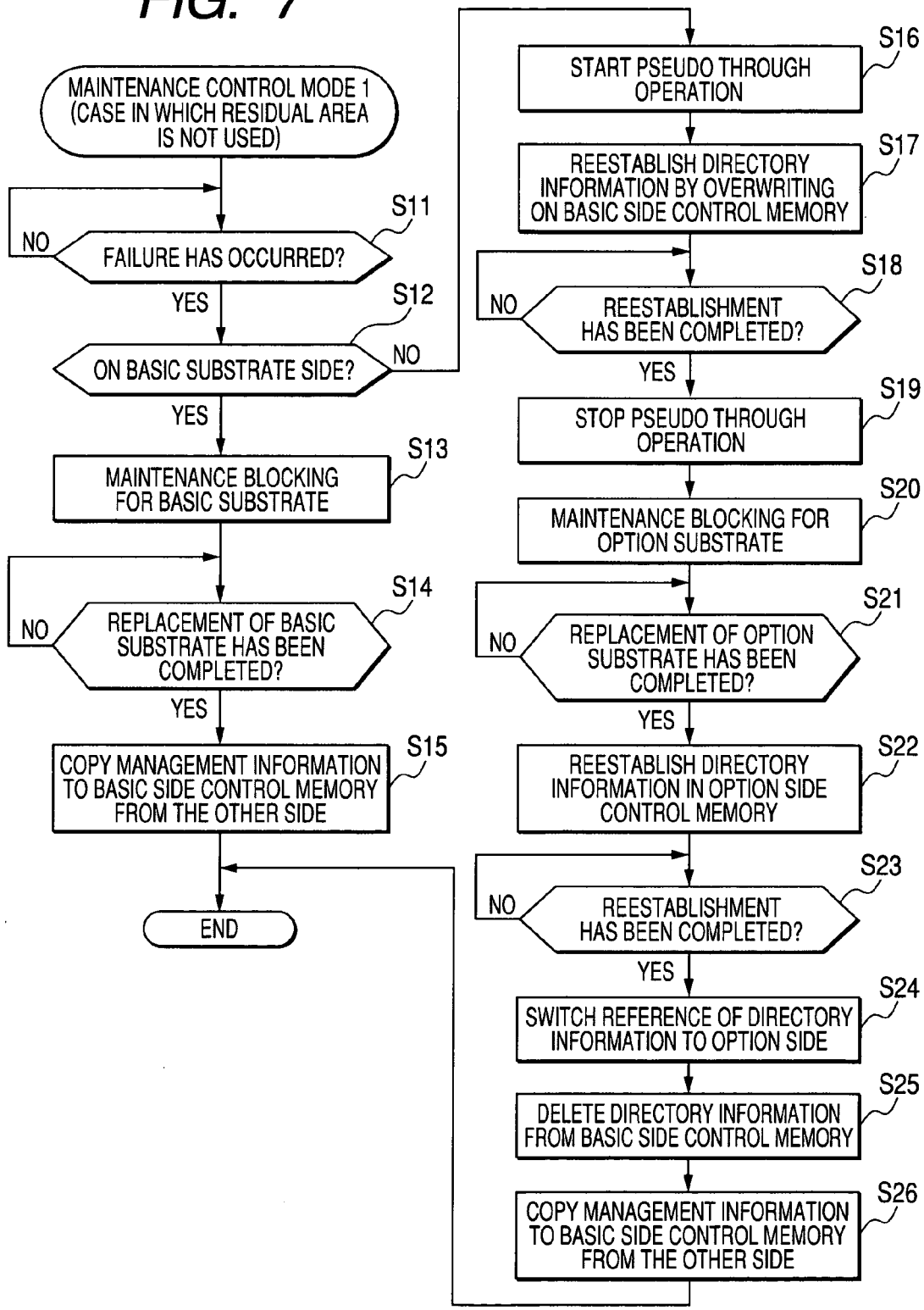
FIG. 7 is a flowchart showing processing according to a first maintenance control mode.
Figure 11:
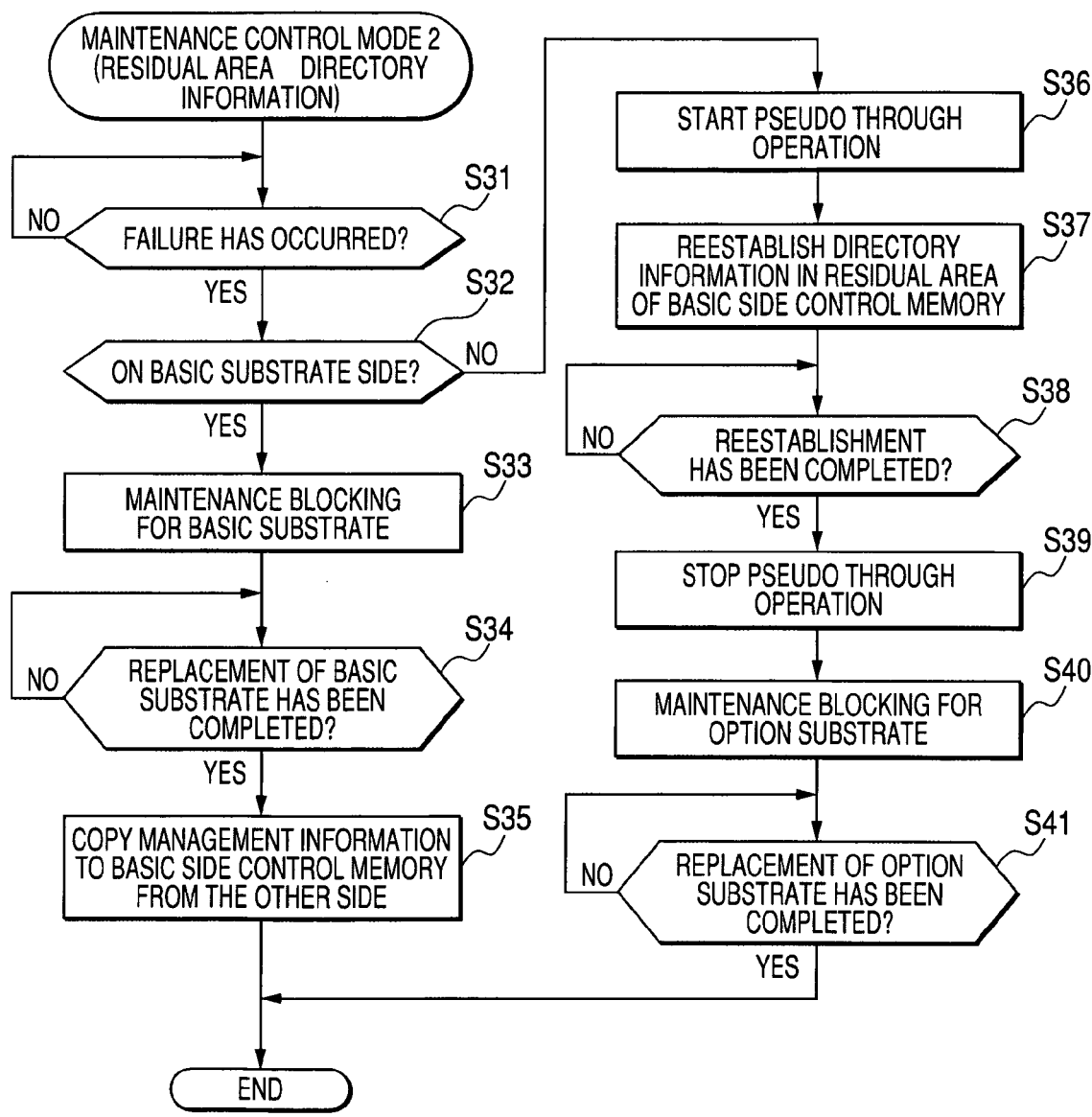
FIG. 11 is a flowchart showing processing according to a second maintenance control mode.

FIG. 11 is a flowchart showing schematic processing of the second maintenance control mode. In steps S31 to S35, the same processing as steps S11 to S15 described in FIG. 7 is performed. In other words, in the case in which a failure has occurred in the shared memory 61 of the basic memory unit storing the management information D1 (S31: YES and S32: YES), the disk array device 10 performs the maintenance blocking processing for the cache package 60 in which the failure has occurred (S33), and then replaces the cache package 60 with a normal cache package 60 (S34: YES). Then, the disk array device 10 copies the management information D1 managed in the other cluster to the shared memory 61 of the normal cache package 60 (S35).

Figure 12:
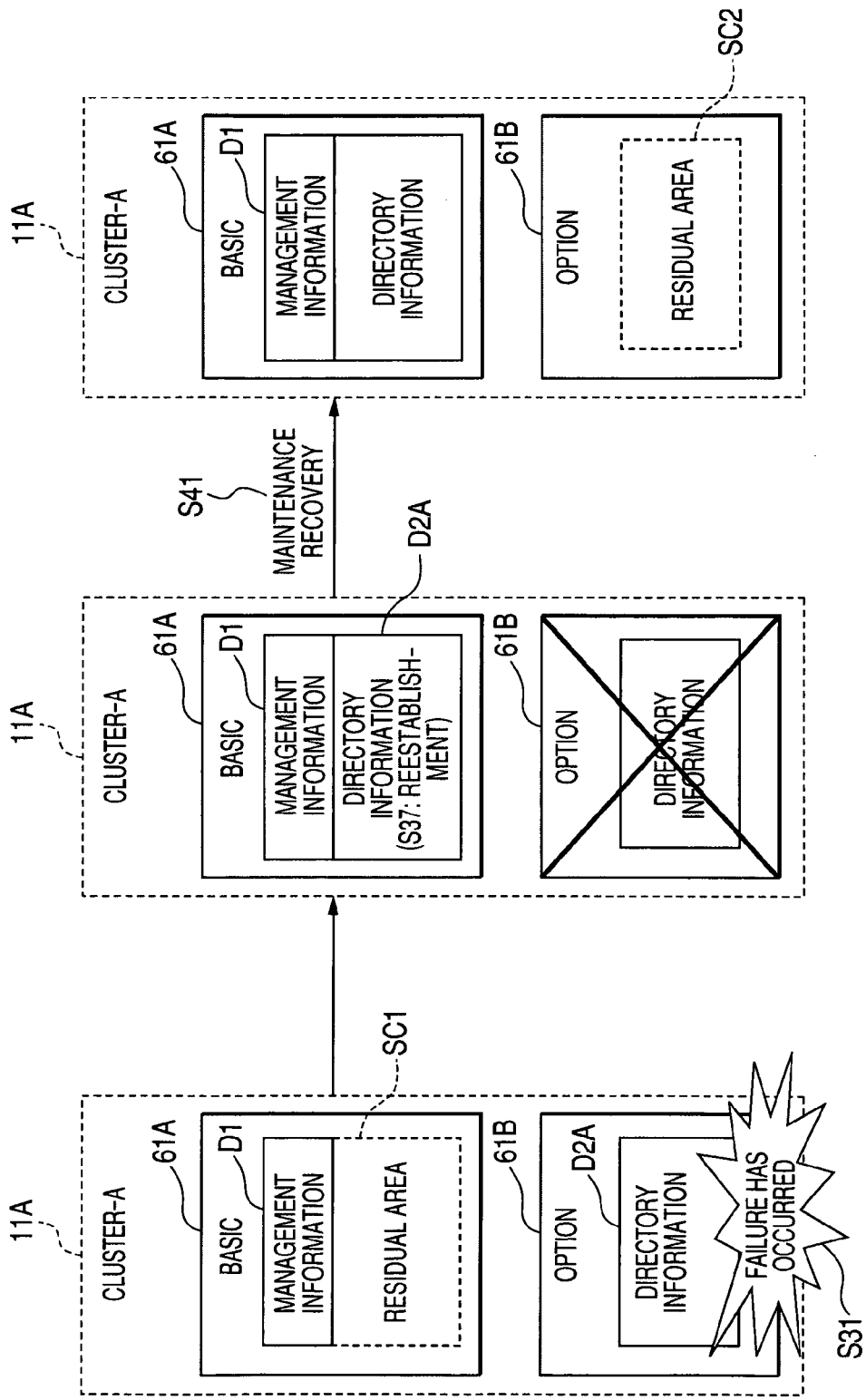
FIGS. 12A to 12C are explanatory diagrams schematically showing a case in which a failure has occurred in an expanded memory section in the second maintenance control mode.
Figure 13:
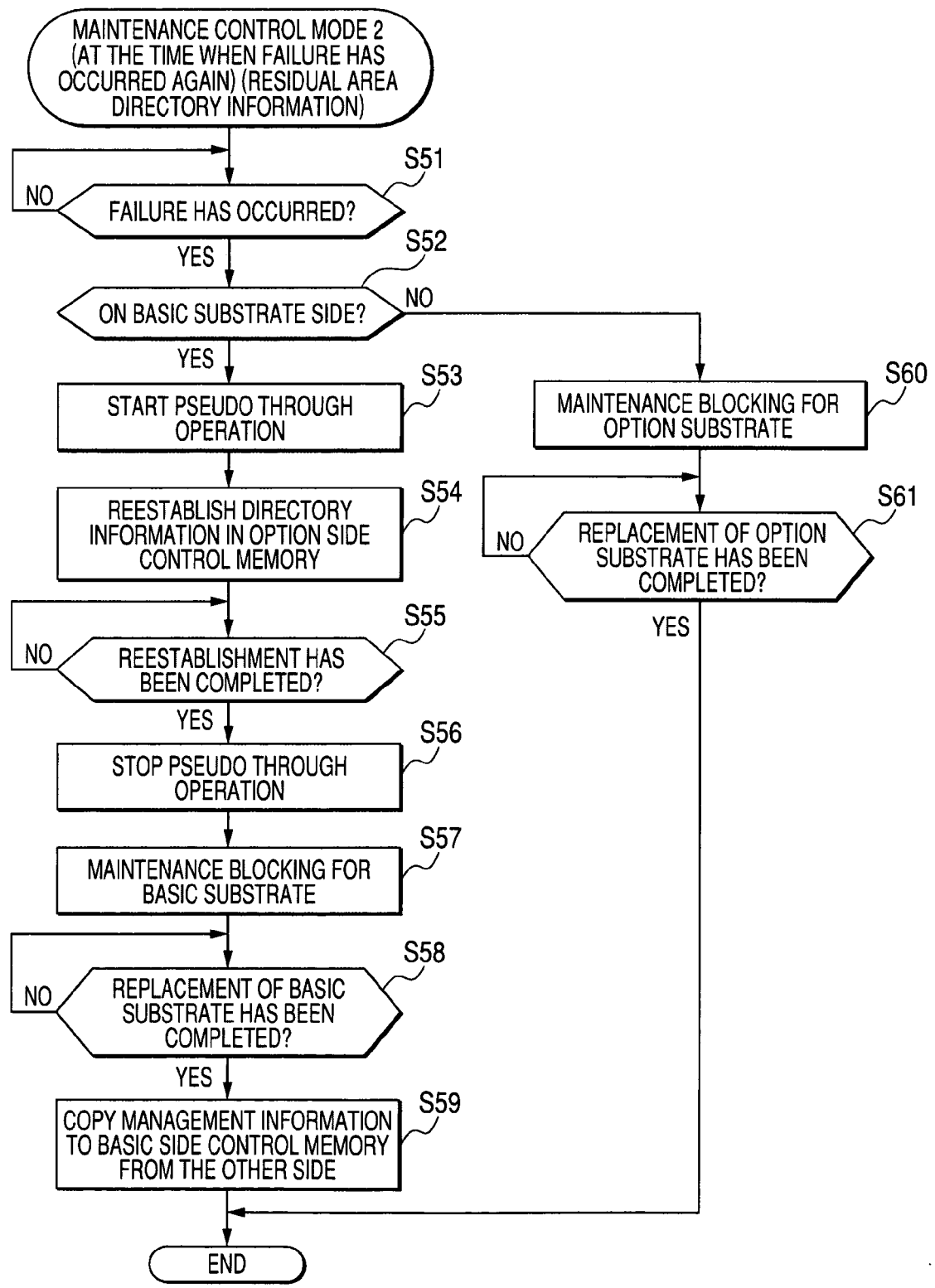
FIG. 13 is a flowchart showing processing in the case in which a failure has occurred again in the second maintenance control mode.

On the other hand, as shown in FIG. 12, in the case in which a failure has occurred in the shared memory 61 of the expanded memory unit storing the directory information D2 (S32: NO), since duplexed management of dirty data cannot be performed, the disk array device 10 shifts to the pseudo through operation mode from the operation mode at the normal time (S36). Then, as shown in FIG. 12B, the disk array device 10 reestablishes the directory information D2 using a residual area SC1 held by the shared memory 61 of the basic memory unit (S37). Since the second maintenance control mode is premised on a case in which a size of the residual area SC1 is larger than a size of the directory information D2 (SC1≧D2), it is possible to reestablish the directory information D2 (D2A in the figure) in the residual area SC1 held by the shared memory 61 of the basic memory unit. In the case in which the directory information D2 is reestablished in the residual area SC1 (S38: YES), since duplexed management of dirty data becomes possible using the reestablished directory information D2, the disk array device 10 ends the pseudo through operation mode (S39).

Then, the disk array device 10 performs the maintenance blocking processing of the cache package 60 of the expanded memory unit in which the failure has occurred (S40). After it is confirmed by the system administrator that the cache package 60, in which the failure has occurred, has been replaced with the normal cache package 60 (S41: YES), the disk array device 10 ends the processing.

As shown in FIG. 12C, in the case in which the directory information D2 is reestablished using the residual area SC1 of the shared memory 61 of the basic memory unit, both the management information D1 and the directory information D2 are stored in the shared memory 61. The directory information D2 is not reestablished in the shared memory 61 mounted to the cache package 60 of the replaced expanded memory unit. Therefore, most of the storage area of the replaced shared memory 61 is an unused residual area SC2.

In the second maintenance control mode, the disk array device leaves the replaced shared memory 61 as it is without immediately reestablishing the directory information D2 therein after the recovery of the directory information D2. This is because, since the directory information D2 is stored in the shared memory 61 of the basic memory unit, there is no inconvenience even if the shared memory 61 is not returned to the initial state before the occurrence of the failure. In addition, a time for completion of maintenance and recovery can be reduced compared with the case in which the directory information D2 is immediately reestablished in the shared memory 61 of the replaced expanded memory unit to return the shared memory 61 to the initial state.

A maintenance control method in the case in which a new failure has further occurred in the state at the time of recovery from a failure shown in FIG. 12C will be described with reference to FIG. 13 to FIGS. 15A to 15C. As shown in FIG. 14A, it is assumed that, in the case in which the management information D1 and the directory information D2 are stored in the shared memory 61 of the basic memory unit, and no information is stored in the shared memory 61 of the expanded memory unit, another failure has occurred in the shared memory 61 of the basic memory unit (S51: YES and S52: YES).

Even in this case, operation of the disk array device 10 can be maintained according to the management information D1 managed in the other cluster. However, in this case, since the directory information D2 cannot be used either, the pseudo through operation mode is started (S53). The disk array device 10 acquires the storage structure of the cache memory 51 and reestablishes the directory information D2 in the shared memory 61 of the expanded memory unit while processing a writing request from the host computer 1 with a pseudo through operation (S54, FIG. 14B). When the directory information D2 is reestablished in the shared memory 61 of the expanded memory unit (S55: YES), the pseudo through operation mode is cancelled (S56). The disk array device 10 subjects the cache package 60 of the basic memory unit, in which the failure has occurred, to the maintenance blocking processing (S57) and waits for the cache package 60 to be replaced with a normal cache package 60 by the system administrator (S58). Then, in the case in which the cache package 60 has been replaced with the normal cache package 60 (S58: YES), the disk array device 10 copies the management information D1 managed in the other cluster to the shared memory 61 of the replaced basic memory unit (S59, FIG. 14C). Consequently, as shown in FIG. 12A and FIG. 14C, in the case in which the cluster is recovered from the failure of the second time, the structures of the basic memory unit and the expanded memory unit return to the initial state.

On the other hand, as shown in FIGS. 15A to 15C, in the case in which the failure of the second time has occurred in the shared memory 61 of the expanded memory unit (S51: YES and S52: NO), the disk array device 10 subjects the cache package 60 of the expanded memory unit to the maintenance blocking processing (S60, FIG. 15B). The directory information D2 has already been established in the shared memory 61 of the basic memory unit and is not stored in the shared memory 61 of the expanded memory unit in which the failure has occurred. Therefore, the disk array device 10 waits for the cache package 60 to be replaced with a normal cache package 60 by the system administrator while maintaining the normal operation without performing reestablishment or the like of the disk information D2 (S61). If the cache package 60 has been replaced with the normal cache package 60 (S61: YES), structures of the basic memory unit and the expanded memory unit in the cluster recovered from the failure are identical with those before the occurrence of the failure of the second time as shown in FIGS. 15A and 15C.

Third maintenance control mode

The third maintenance control mode will be described with reference to FIG. 16 to FIGS. 21A to 21C. The third maintenance control mode is premised on a case in which a size of a residual area held by the shared memory 61 of the basic memory unit is smaller than a size of the directory information D2.

Figure 16:
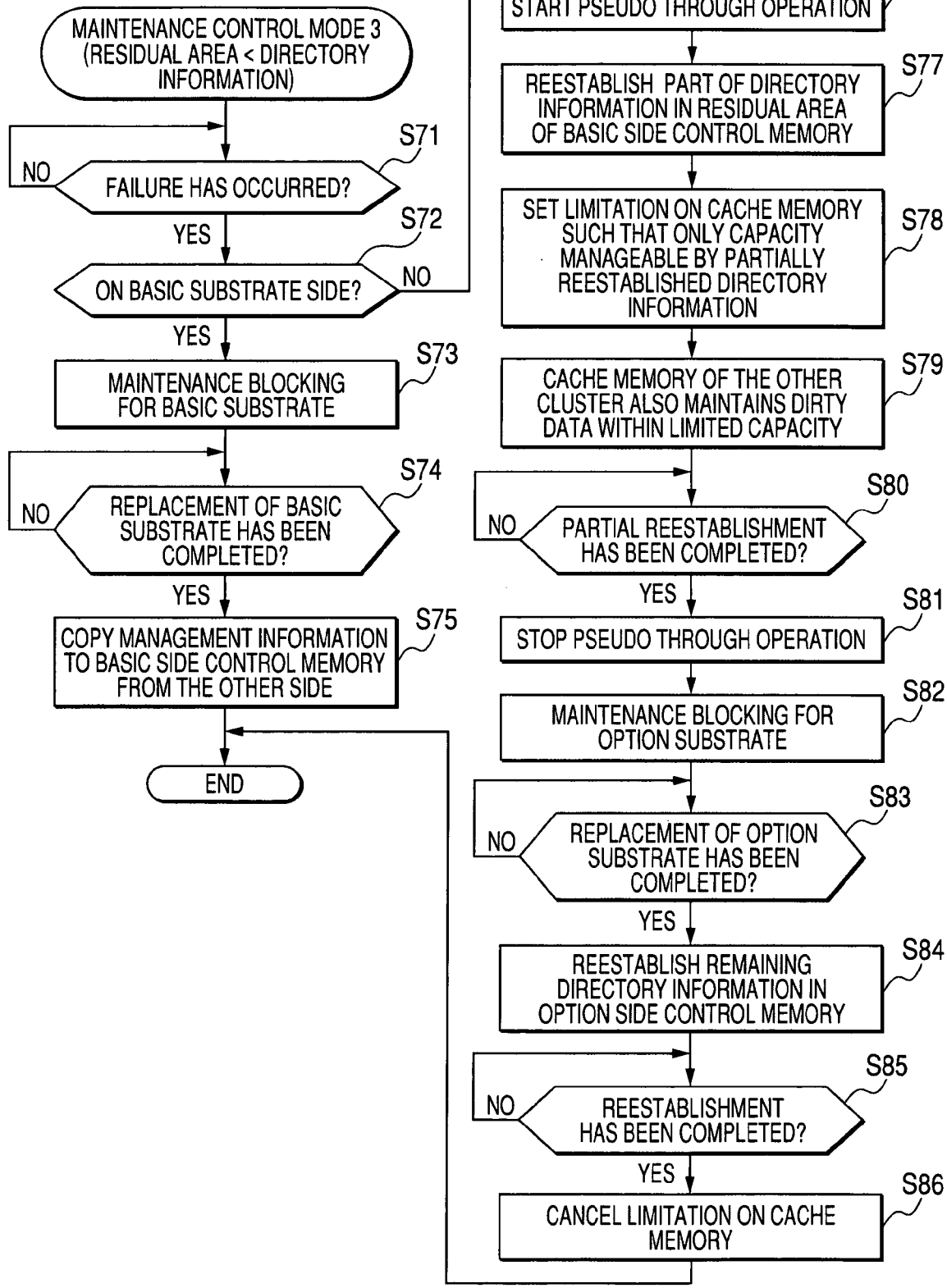
FIG. 16 is a flowchart showing processing according to a third maintenance control mode.

FIG. 16 is a flowchart showing schematic processing of the third maintenance control mode. In steps S71 to S75, the same processing as steps S11 to S15 described in FIG. 7 is performed. In other words, in the case in which a failure has occurred in the shared memory 61 of the basic memory unit storing the management information D1 (S71: YES and S72: YES), the disk array device 10 performs the maintenance blocking processing for the cache package 60 in which the failure has occurred (S73), and then replaces the cache package 60 with a normal cache package 60 (S74: YES). Then, the disk array device 10 copies the management information D1 managed in the other cluster to the shared memory 61 of the normal cache package 60 (S75).

On the other hand, as shown in FIGS. 17A to 17C, in the case in which a failure has occurred in the shared memory 61 of the expanded memory unit (S71: YES and S72: NO), the directory information D2 cannot be used. Thus, the disk array device 10 shifts to the pseudo through operation mode (S76). Next, the disk array device 10 reestablishes the directory information D2 using the residual area SC1 held by the shared memory 61 of the basic memory unit (S77, FIG. 17B).

Here, since a size of the residual area SC1 held by the shared memory 61 of the basic memory unit is smaller than a size of the directory information D2 (SC1<D2), the entire directory information D2 cannot be reestablished completely in the shared memory 61 of the basic memory unit. As shown in FIG. 17C, first partial directory information D2A1, which is a part of directory information, is reestablished in the shared memory 61 of the basic memory unit according to the size of the residual area SC1.

Figure 18:
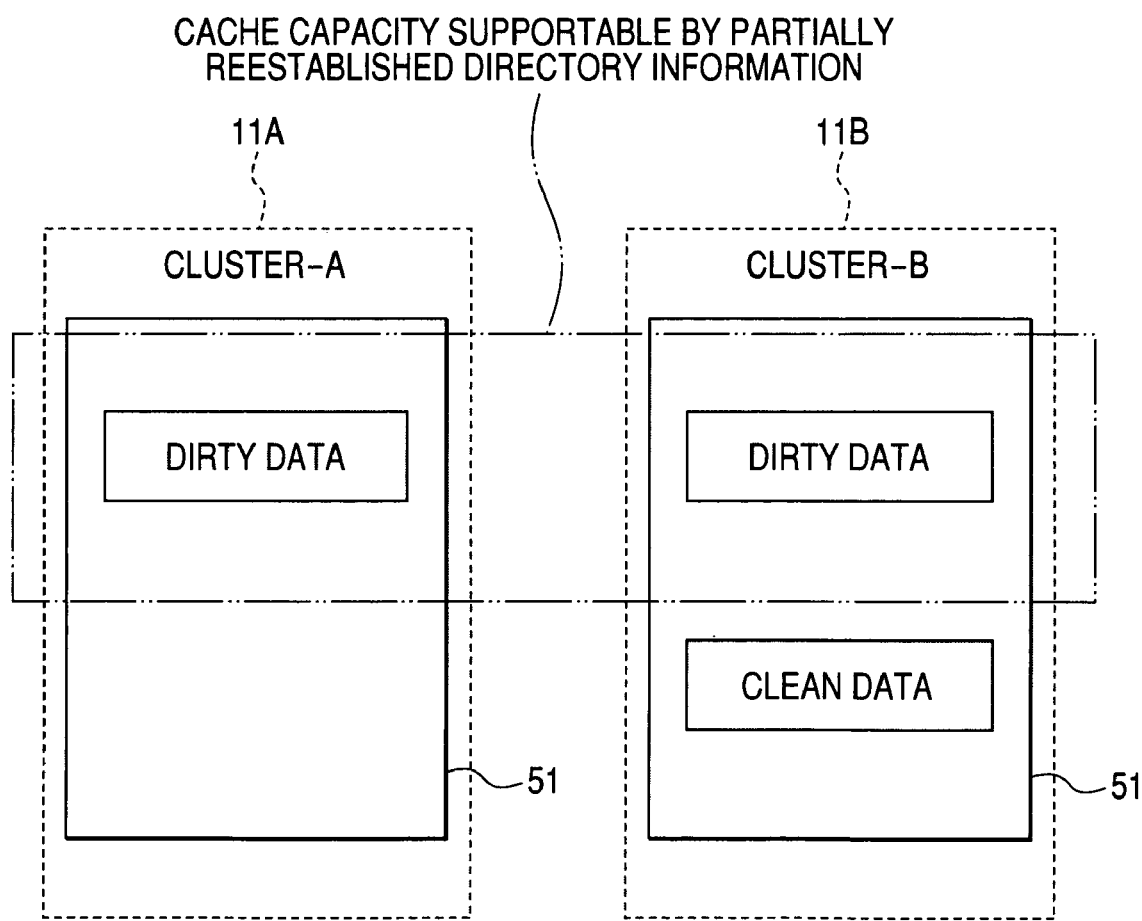
FIG. 18 is an explanatory diagram showing a state in which a usable range of cache memories of each cluster is limited according to directory information which is reestablished partly.
Figure 19:
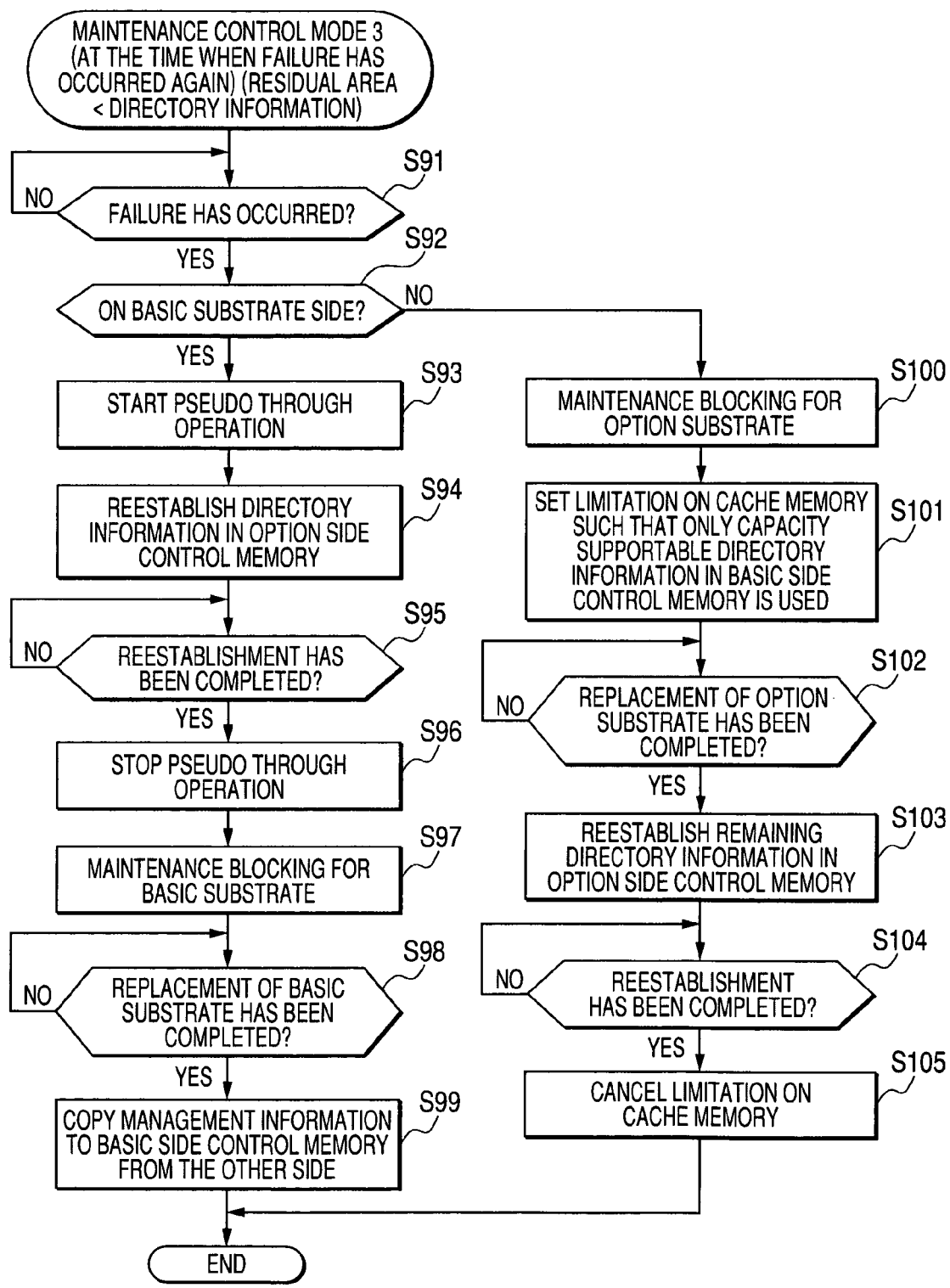
FIG. 19 is a flowchart showing processing in the case in which a failure has occurred again in the third maintenance control mode.

The disk array device 10 sets a use limit of the cache memory 51 such that the cache memory 51 is used by a capacity manageable by the first partial directory information D2A1 (S78) FIG. 18 is an explanatory diagram schematically showing a state of the cache memory 51 for which the use limit is set. In FIG. 18, the cache memories 51 in an identical cluster are shown as one cache memory 51. A usable capacity of the cache memories 51 of the clusters 11A and 11B is limited to a range supportable by the first partial directory information D2A1 as indicated by an imaginary line in the figure. In a normal cluster in which a failure has not occurred, a use limit is also set for the cache memory 51. Then, dirty data written from the host computer 1 is stored in an area supportable by the first partial directory information D2A1 (S79).

The disk array device 10 judges whether or not reestablishment of the first partial directory information D2A1 is completed (S80) and, if the reestablishment is completed (S80: YES), stops the pseudo through operation (S81). This is because, as described with reference to FIG. 18, since the cache memories 51 of the clusters 11A and 11B are set to be used within the range supportable by the first partial directory information D2A1, dirty data can be duplexed and held in the respective cache memories 51.

The disk array device 10 subjects the cache package 60 of the expanded memory unit, in which the failure has occurred, to the maintenance blocking processing (S82) and judges whether or not the cache package 60 of the expanded memory unit has been replaced by the system administrator (S83). In the case in which the cache package 60 has been replaced (S83: YES), the disk array device 10 reestablishes second partial directory information D2A2 in the shared memory 61 of the replaced expanded memory unit (S84, FIG. 17C). The second partial directory information D2A2 is residual direction information, which was not reestablished by the first partial direction information D2A1, of the directory information D2 (D2=D2A1+D2A2).

In the case in which the reestablishment of the second partial directory information D2A2 is completed (S85: YES), the disk array device 10 cancels the use limit of the cache memory 51 (S86) and ends the processing. This is because, since the entire directory information D2 is restored by the reestablishment of the second partial directory information D2A2, the cache memories of the clusters 11A and 11B become usable without limitation.

In this way, in the third maintenance control mode, the residual area SC1 held by the shared memory 61 of the basic memory unit is used as a work area at the time of recovery from a failure, whereby the directory information D2 is partially reestablished according to a size of the residual area SC1. It becomes possible to use the cache memory 51 partially according to the partially reestablished first partial directory information D2A1, and duplexing of dirty data can be performed at an early stage. Then, in the case in which the cache package 60 of the expanded memory unit has been replaced, the residual directory information D2A2 is reestablished in the new shared memory 61. Therefore, as shown in FIG. 17C, the second partial directory information D2A2 is stored in the replaced shared memory 61, and the other storage areas change to the residual area SC2. The third maintenance control mode maintains the configuration of the respective shared memories 61 in a configuration at the point when the shared memories have recovered from the failure of the first time and does not return the configuration to the initial state.

Processing in the case in which yet another failure has occurred in the first failure recovery state shown in FIG. 17C will be described with reference to FIG. 19 to FIGS. 21A to 21C.

As shown in FIG. 20A, when a new failure has occurred in the shared memory 61 of the basic memory unit (S91: YES and S92: YES), the disk array device 10 shifts to the pseudo through operation mode (S93). This is because the first partial directory information D2A1, which is partially reestablished in the shared memory 61 of the basic memory unit, cannot be used, and duplexing of dirty data cannot be performed in the respective cache memories 51.

Then, as shown in FIG. 20B, the disk array device 10 performs reestablishment of the entire directory information D2 in the shared memory 61 of the expanded memory unit (S94). When the reestablishment of the directory information D2 is completed (S95: YES), the disk array device 10 stops the pseudo through operation mode (S96) and subjects the cache package 60 of the basic memory unit, in which the failure has occurred, to the maintenance blocking processing (S97). When it is confirmed that the cache package 60 of the basic memory unit has been replaced with a normal product by the system administrator (S98: YES), the disk array device 10 copies the management information D1 managed in the other cluster to the shared memory 61 of the replaced basic memory unit (S99, FIG. 20C). As shown in FIG. 17A and FIG. 20C, a configuration of the respective shared memories 61 return to the initial state as the shared memory recovers from the failure of the second time.

On the other hand, as shown in FIG. 21A, in the case in which a failure has occurred in the shared memory 61 of the expanded memory unit (S91: YES and S92: NO), the disk array device 10 subjects the cache package 60 of the expanded memory unit to the maintenance blocking processing (S100). Next, as described with reference to FIG. 18, the disk array device 10 limits a usable range of the respective cache memories 51 to a range supportable by the first partial directory information D2A1 (S101). Consequently, the disk array device 10 can process a writing request from the host computer 1 without performing the pseudo through operation.

When it is confirmed that the cache package 60 of the expanded memory unit has been replaced with a normal product (S102: YES), as described in steps S84 to S86 of FIG. 16, the disk array device 10 reestablishes the second partial directory information D2A2 in the replaced shared memory 61 (S103, FIG. 21C). Then, in the case in which the reestablishment of the second partial directory information D2A2 is completed (S104: YES), the disk array device 10 cancels the use limit with respect to the respective cache memories 51 (S105).

According to this embodiment constituted as described above, since the cache memory 51 and the shared memory 61 are divided into the separate packages 50 and 60, even in the case in which a failure has occurred in the cache memory 51 or the shared memory 61, maintenance and recovery work can be performed separately. In addition, since a package is divided for each of the memories 51 and 61, and a memory control circuit is mounted to the respective packages, parallel access to the respective memories 51 and 61 can be performed, which contribute to an increase in speed of the disk array device 10.

Moreover, since the control information is divided into the management information D1 and the directory information D2 and stored in the shared memory 61 separately, duplexing of the management information D1 and simplexing of the directory information D2 can be realized efficiently. Therefore, a frequency of writing in the shared memory 61 of the expanded memory unit storing the directory information D2 can be reduced, and load on the disk array device 10 can also be reduced. In other words, since the control information is divided into the two kinds of information D1 and D2 on the basis of a request in terms of multiplexed management, information management is facilitated, and workability of maintenance and recovery is also improved.

Moreover, the control information is divided into the management information D1 and the directory information D2, whereby the pseudo through operation mode can be cancelled at the point when only the directory information D2 is reestablished. Therefore, it is unnecessary to perform the pseudo through operation over the entire period of maintenance and restoration, and an execution period of a pseudo through operation can be reduced to only a time required for the reestablishment of the directory information D2. Consequently, a time during which performance of the disk array device 10 falls at the time when a failure occurs can be reduced.

In addition, since the storage area held by the shared memory 61 of the basic memory unit storing the duplexed management information D1 is used as a work area, the directory information D2 can be reestablished in a relatively short time without providing a work memory dedicated for restoration from a failure.

Note that the present invention is not limited to the above-mentioned embodiment. Those skilled in the art can perform various additions, modifications, and the like within a scope of the present invention. For example, although the example of mounting the two cache memories and the two shared memories in the respective clusters is described in the embodiment, the present invention is not limited to this, and three or more cache memories and shared memories may be mounted, respectively. Alternatively, the number of cache memories and the number of shared memories may be different.

What is claimed is:

1. A disk array comprising:
    channel adapters which control exchange of data with host apparatuses;
    disk adapters which control exchange of data with storage devices;
    cache memory packages which are used by the channel adapters and the disk adapters and have cache memories storing data;
    first control memory packages which are used by the channel adapters and the disk adapters and have first control memories storing management information which is used for controlling the operation of the disk array device; and
    second control memory packages which are used by the channel adapters and the disk adapters and have second control memories storing storage structure information with regard to a storage structure of the cache memory,
    wherein the management information is stored in the first control memories, respectively, and multiplexed, and at least one maintenance control unit which, in the case in which a failure has occurred in one of the second control memories, restores the storage structure information stored in the second control memory in which the failure has occurred,
    wherein the maintenance control unit restores the storage structure information stored in the second control memory, in which the failure has occurred, using a storage area of the first control memories, and
    wherein the maintenance control unit executes at least one of (1) a first maintenance mode which is executable in the case in which no usable free space exists in the first control memories, (2) a second maintenance mode which is executable in the case in which a usable free space exists as a predetermined value or more in the first control memories, and (3) a third maintenance mode which is executable in the case in which a usable free space exists as less than the predetermined value in the first control memories, and (1) the first maintenance mode is a mode for, (1-1) in the case in which a failure has occurred in one of the first control memories, if the first control memory, in which the failure has occurred, has been replaced with a normal product, restoring the management information by copying the management information multiplexed in the other first control memories to the replaced the first control memory, and (1-2) in the case in which a failure has occurred in the second control memory, reestablishing the storage structure information overwriting the storage structure information on the first control memory, and if the second control memory, in which the failure has occurred, has been replaced with a normal product, reestablishing the storage structure information in the replaced second control memory, and restoring the management information by copying the management information multiplexed in the other first control memories to the first control memory on which the storage structure information has been overwritten, (2) the second maintenance mode is a mode for, (2-1) in the case in which a failure has occurred in one of the first control memories, if the first control memory, in which the failure has occurred, has been replaced with a normal product, restoring the management information by copying the management information multiplexed in the other first control memories to the replaced first control memory, and (2-2) in the case in which a failure has occurred in the second control memory, reestablishing the storage structure information in a free space of the first control memory, and permitting replacement of the second control memory, in which the failure has occurred, with a normal product, and (3) the third maintenance mode is a mode for, (3-1) in the case in which a failure has occurred in one of the first control memories, if the first control memory, in which the failure has occurred, has been replaced with a normal product, restoring the management information by copying the management information multiplexed in the other first control memories to the replaced first control memory, and (3-2) in the case in which a failure has occurred in the second control memory, partly reestablishing the storage structure information by a range which can be reestablished in a free space of the first control memory, and if the second control memory, in which the failure has occurred, has been replaced with a normal product, reestablishing a remaining part, which is not reestablished, of the storage structure information in the replaced second control memory.

2. A disk array device according to claim 1, wherein the maintenance control unit, in the case in which the second maintenance mode is executed, (2-1A) if a failure has occurred in the first control memory in which the storage structure information is reestablished, reestablishes the storage structure information in the replaced second control memory, and if the first control memory, in which the failure has occurred, has been replaced with a normal product, restores the management information by copying the management information multiplexed in the other first control memories to the replaced first control memory, and (2-2A) if a failure has occurred in the replaced second control memory, permits replacement with a normal product.

3. A disk array device according to claim 1, wherein the maintenance control unit, in the case in which the third maintenance mode is executed, (3-1A) if a failure has occurred in the first control memory in which the storage structure information is partially reestablished, reestablishes the entire storage structure information in the replaced second control memory, and if the first control memory, in which the failure has occurred, has been replaced with a normal product, restores the management information by copying the management information multiplexed in the other first control memories to the replaced first control memory, and (3-2A) if a failure has occurred in the replaced second control memory, permits replacement with a normal product, and if the second control memory in which a failure has occurred has been replaced with a normal product, reestablishes the remaining part of the storage structure information in the replaced second control memory.

4. A disk array device according to claim 1, wherein, in the case in which the third maintenance mode is executed, the maintenance control unit limits a used area of the cache memories to a range which is manageable by the storage structure information which is partly reestablished in a free space of the first control memory.

5. A disk array device according to claim 3, wherein, in the case in which the third maintenance mode is executed, the maintenance control unit limits a used area of the cache memories to a range which is manageable by the storage structure information which is partly reestablished in a free space of the first control memory.

6. A maintenance method for a disk array device comprising:

channel adapters which control exchange of data with host apparatuses; disk adapters which control exchange of data with storage devices; cache memories which are used by the channel adapters and the disk adapters and store data, respectively; first control memories which are used by the channel adapters and the disk adapters and store management information concerning a device configuration and a device operation, respectively; and second control memories which are used by the channel adapters and the disk adapters and store storage structure information concerning a storage structure of the respective cache memories, respectively, wherein the management information is stored in the respective first control memories and multiplexed, the maintenance method comprising:

a failure detection step of detecting whether or not a failure has occurred in any one of the first control memories and the second control memories; and a maintenance step of, in the case in which a failure is detected, restoring information stored in one of the first control memories or one of the second control memories, in which the failure has occurred, wherein the maintenance step exclusively executes one of (1) a first maintenance mode which is executable in the case in which no usable free space exists in the first control memories, (2) a second maintenance mode which is executable in the case in which a usable free space exists as a predetermined value or more in the first control memories, and (3) a third maintenance mode which is executable in the case in which a usable free space exists as less than the predetermined value in the first control memories, and (1) the first maintenance mode comprises the steps of:

(1-1) in the case in which a failure has occurred in the first control memory, if the first control memory, in which the failure has occurred, has been replaced with a normal product, copying the management information multiplexed in the other first control memories to the replaced first control memory, and (1-2) in the case in which a failure has occurred in the second control memory, reestablishing the storage structure information overwriting the storage structure information on the first control memory, and if the second control memory, in which the failure has occurred, has been replaced with a normal product, reestablishing the storage structure information in the replaced second control memory, and copying the management information multiplexed in the other first control memories to the first control memory on which the storage structure information has been overwritten, (2) the second maintenance mode comprises the steps of:

(2-1) in the case in which a failure has occurred in the first control memory, if the first control memory, in which the failure has occurred, has been replaced with a normal product, copying the management information multiplexed in the other first control memories to the replaced first control memory, and (2-2) in the case in which a failure has occurred in the second control memory, reestablishing the storage structure information in a free space of the first control memory, and permitting replacement of the second control memory, in which the failure has occurred, with a normal product, and (3) the third maintenance mode comprises the steps of;

(3-1) in the case in which a failure has occurred in the first control memory, if the first control memory, in which the failure has occurred, has been replaced with a normal product, copying the management information multiplexed in the other first control memories to the replaced first control memory, and (3-2) in the case in which a failure has occurred in the second control memory, partly reestablishing the storage structure information by a range which can be reestablished in a free space of the first control memory, and if the second control memory, in which the failure has occurred, has been replaced with a normal product, reestablishing a remaining part, which is not reestablished, of the storage structure information in the replaced second control memory.

7. A maintenance method for a disk array device according to claim 6, wherein the maintenance step further comprises, in the case in which the second maintenance mode is executed;

(2-1A) if a failure has occurred in the first control memory in which the storage structure information is reestablished, reestablishing the storage structure information in the replaced second control memory, and if the first control memory, in which the failure has occurred, has been replaced with a normal product, copying the management information multiplexed in the other first control memories to the replaced first control memory, and (2-2A) if a failure has occurred in the replaced second control memory, permitting replacement with a normal product.

8. A maintenance method for a disk array device according to claim 6, wherein the maintenance step further comprises, in the case in which the third maintenance mode is executed;

(3-1A) if a failure has occurred in the first control memory in which the storage structure information is partially reestablished, reestablishing the entire storage structure information in the replaced second control memory, and if the first control memory, in which the failure has occurred, has been replaced with a normal product, copying the management information multiplexed in the other first control memories to the replaced first control memory, and (3-2A) if a failure has occurred in the replaced second control memory, permitting replacement with a normal product, and if the second control memory in which a failure has occurred has been replaced with a normal product, reestablishing the remaining part of the storage structure information in the replaced second control memory.

* * * * *